United States Patent
Amurri et al.

(10) Patent No.: US 8,322,907 B2
(45) Date of Patent: Dec. 4, 2012

(54) PROCESS AND APPARATUS FOR CONTINUOUSLY PRODUCING AN ELASTOMERIC COMPOSITION

(75) Inventors: Cesare Emanuele Amurri, Milan (IT); Simone Francesco Pala, Milan (IT); Roberto Zavaglio, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 472 days.

(21) Appl. No.: 12/733,208

(22) PCT Filed: Aug. 20, 2007

(86) PCT No.: PCT/EP2007/007331
§ 371 (c)(1),
(2), (4) Date: Feb. 17, 2010

(87) PCT Pub. No.: WO2009/024167
PCT Pub. Date: Feb. 26, 2009

(65) Prior Publication Data
US 2010/0149902 A1  Jun. 17, 2010

(51) Int. Cl.
B29B 7/72 (2006.01)
B29B 7/88 (2006.01)
B29C 47/10 (2006.01)
B29C 47/92 (2006.01)

(52) U.S. Cl. ............ 366/76.2; 366/76.4; 366/76.6; 366/91; 366/141; 366/156.2; 366/158.4; 222/58; 425/148

(58) Field of Classification Search ...... 366/76.1–76.93, 366/79–91, 141, 156.1, 156.2, 158.1, 158.4; 222/55–58; 425/148, 200–209
See application file for complete search history.

(56) References Cited

U.S. PATENT DOCUMENTS
4,498,783 A * 2/1985 Rudolph .................. 366/132
(Continued)

FOREIGN PATENT DOCUMENTS
EP  507689 A2 * 10/1992
(Continued)

OTHER PUBLICATIONS
EllwoOd; "A Tale of Continuous Development", European Rubber Journal, pp. 26-28, (1987). European Search Report for International Application No. PCT/EP2007/007331, mailing date May 16, 2008.

Primary Examiner — Charles E Cooley
(74) Attorney, Agent, or Firm — Finnegan, Henderson, Farabow, Garrett & Dunner, L.L.P.

(57) ABSTRACT

A process for continuously producing an elastomeric composition includes the step of dosing into at least one extruder at least one ingredient by means of a dosing device, wherein the dosing step is regulated on the basis of: i) actual weight values of the at least one ingredient measured at dosing instants of an evaluation time period of predetermined duration preceding a given dosing instant; ii) expected weight values of the at least one ingredient calculated for corresponding dosing instants of the evaluation time period of predetermined duration preceding the dosing instant; and iii) expected weight values of the at least one ingredient calculated for a prediction time period of predetermined duration following the dosing instant; so as to minimize a prediction weight error between actual weight values measured during the prediction time period and the expected weight values calculated for the prediction time period, and a model weight error between actual weight values measured during the prediction time period and theoretical weight values of the at least one ingredient corresponding to the target weight loss of the at least one ingredient.

37 Claims, 10 Drawing Sheets

U.S. PATENT DOCUMENTS

| | | | |
|---|---|---|---|
| 4,976,904 A * | 12/1990 | Bilhorn | 264/104 |
| 5,158,725 A * | 10/1992 | Handa et al. | 264/40.7 |
| 5,332,308 A * | 7/1994 | Scheuring | 366/76.3 |
| 5,374,387 A | 12/1994 | Barnes et al. | |
| 6,474,972 B1 * | 11/2002 | Endo et al. | 425/148 |
| 7,407,611 B2 * | 8/2008 | Innerebner et al. | 264/141 |
| 7,964,128 B2 * | 6/2011 | Caretta et al. | 264/211.21 |
| 2005/0040555 A1 * | 2/2005 | Caretta et al. | 264/211.21 |
| 2005/0078550 A1 * | 4/2005 | Landers | 366/158.1 |
| 2005/0087906 A1 * | 4/2005 | Caretta et al. | 264/211 |
| 2010/0149902 A1 * | 6/2010 | Amurri et al. | 366/76.2 |

FOREIGN PATENT DOCUMENTS

| | | |
|---|---|---|
| EP | 0 512 303 A1 | 11/1992 |
| WO | WO 03/009989 A1 | 2/2003 |

* cited by examiner

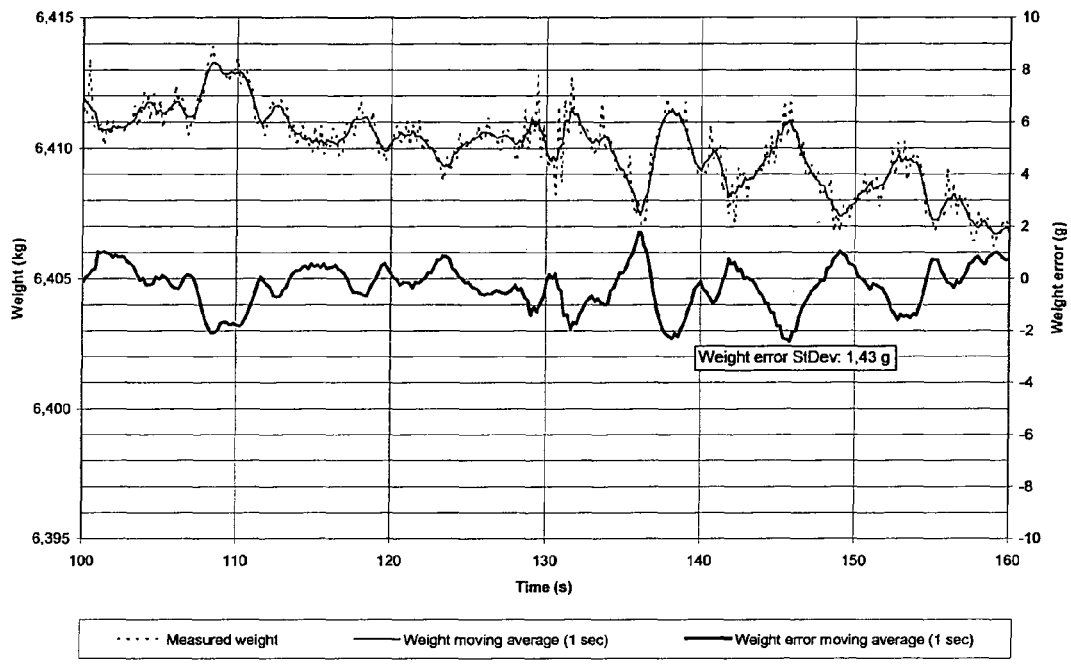
FIG. 3a - PRIOR ART
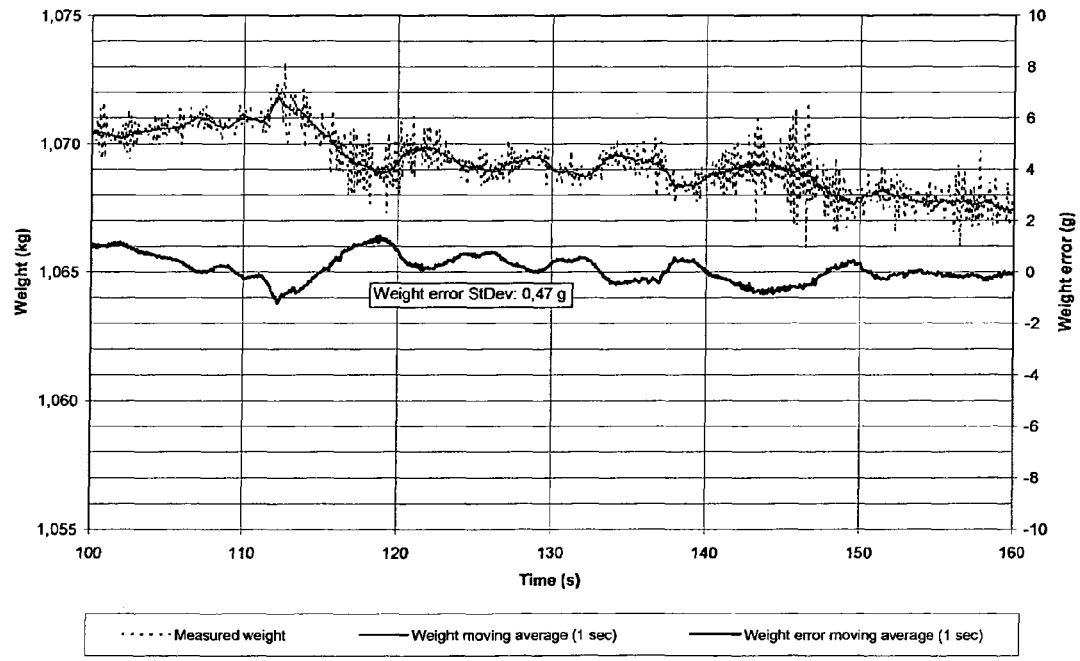
FIG. 3b - INVENTION

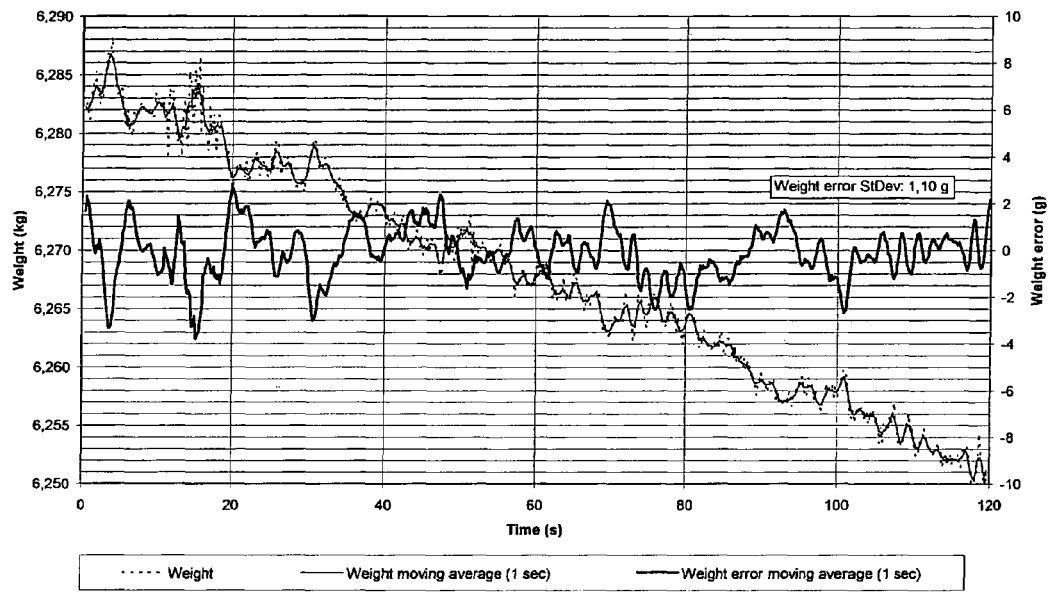
FIG. 4a - PRIOR ART
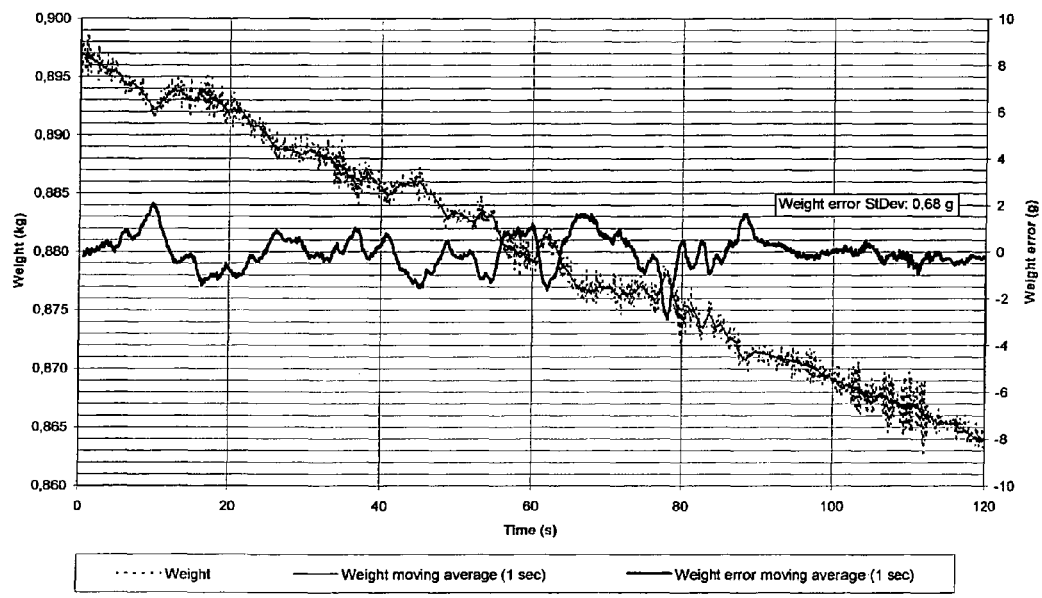
FIG. 4b - INVENTION

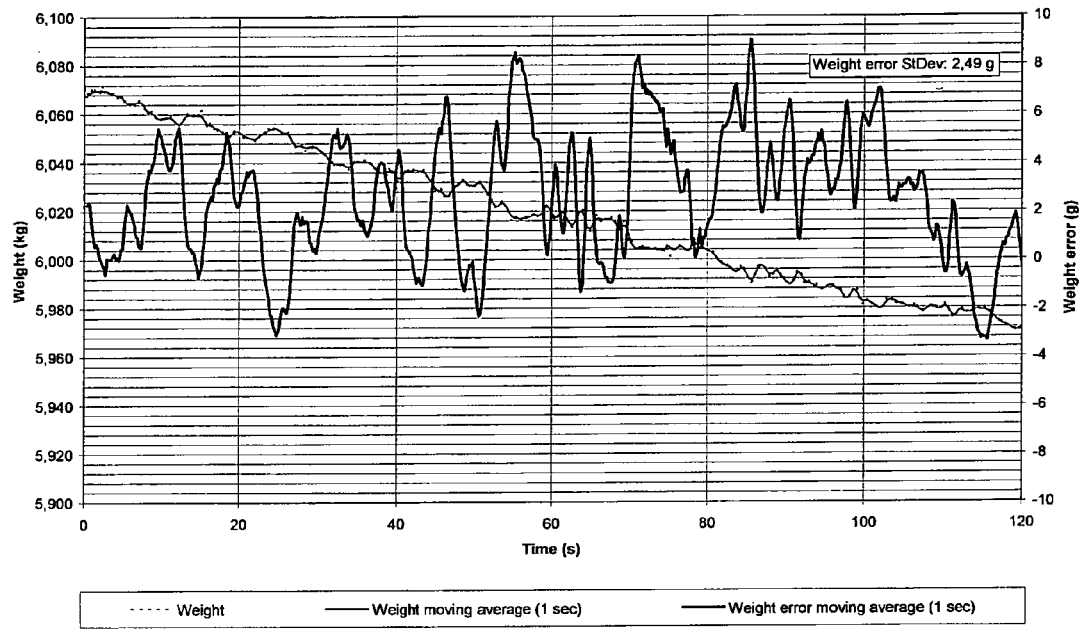
FIG. 5a - PRIOR ART
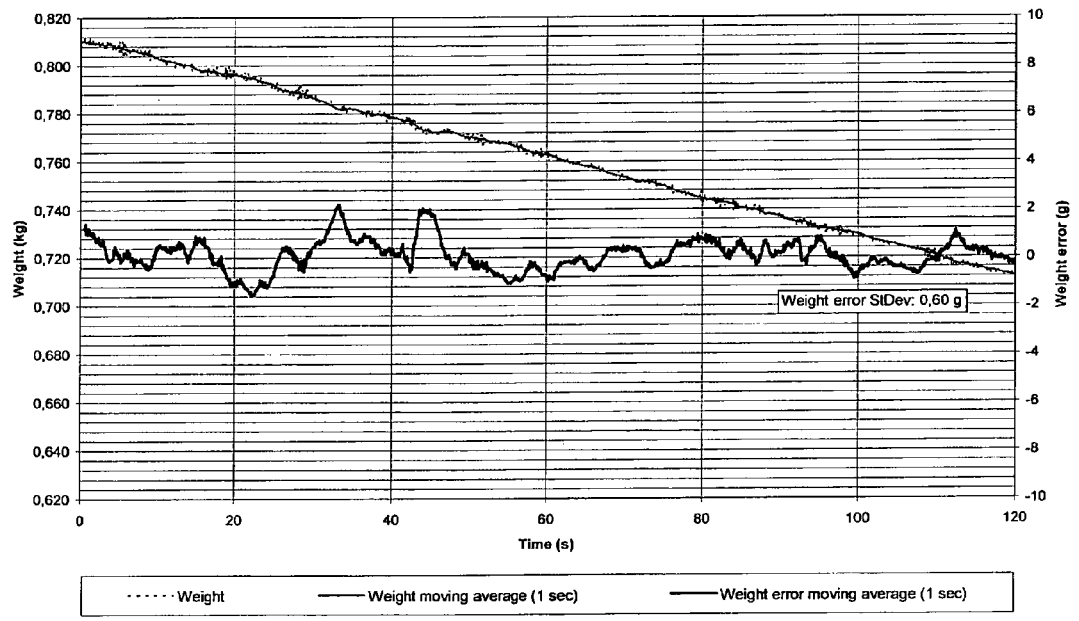
FIG. 5b - INVENTION

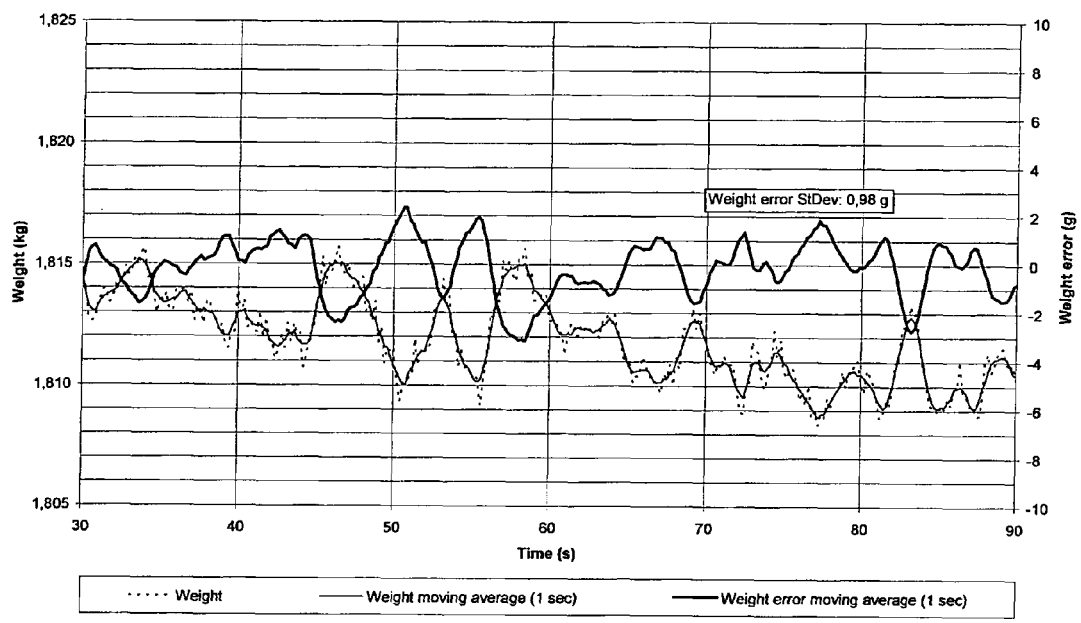
FIG. 6a - PRIOR ART
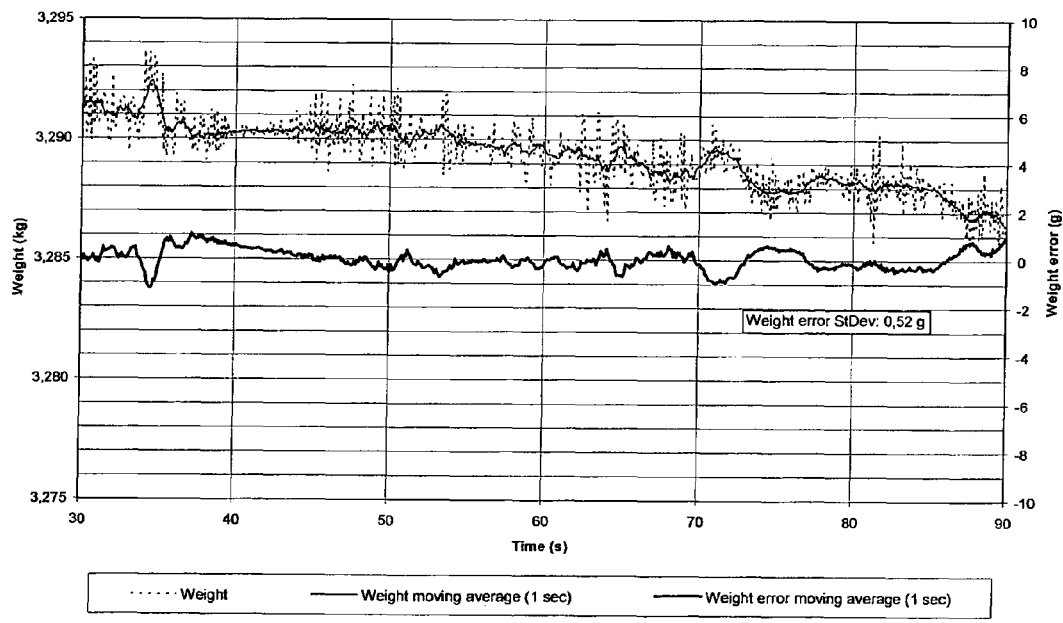
FIG. 6b - INVENTION

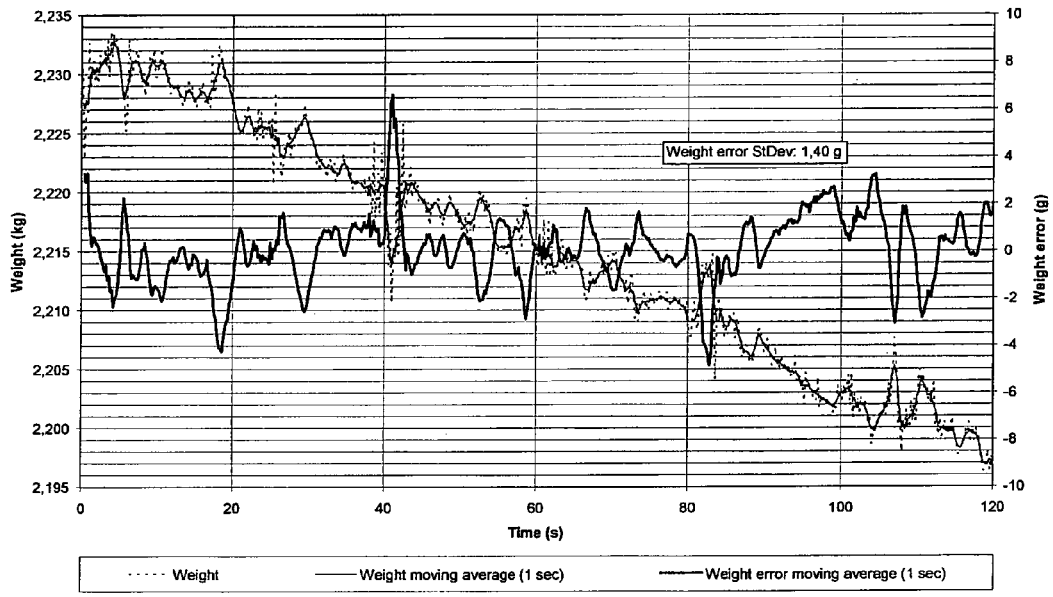
FIG. 7a - PRIOR ART
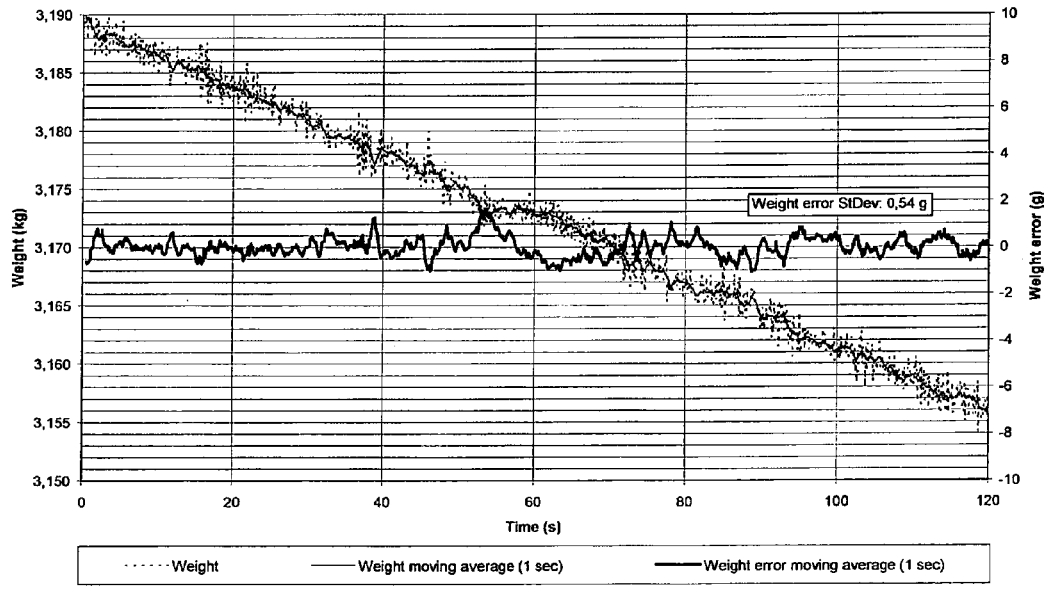
FIG. 7b - INVENTION

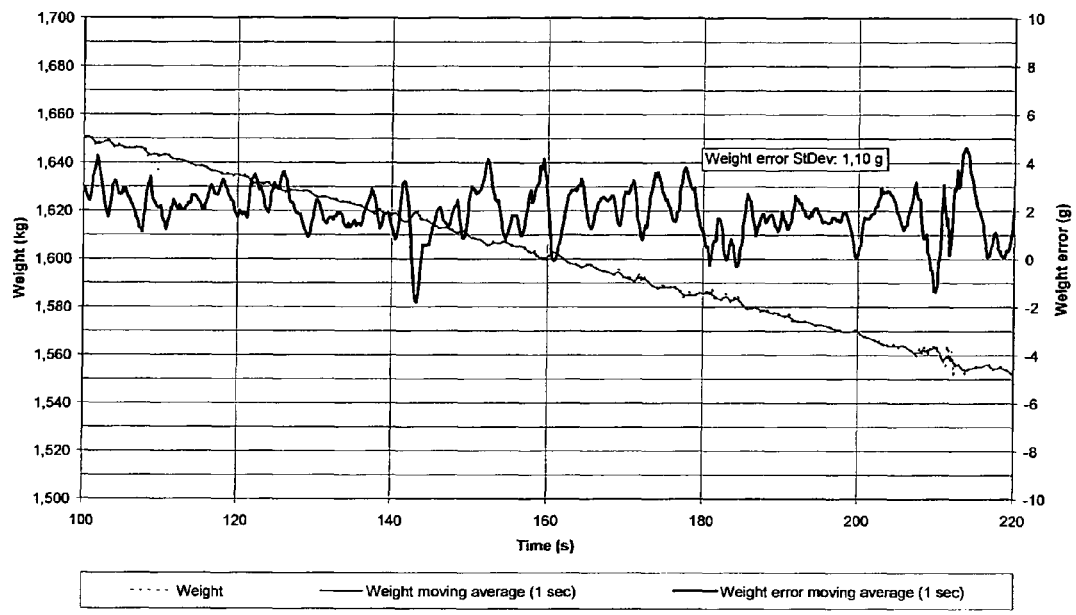
FIG. 8a - PRIOR ART
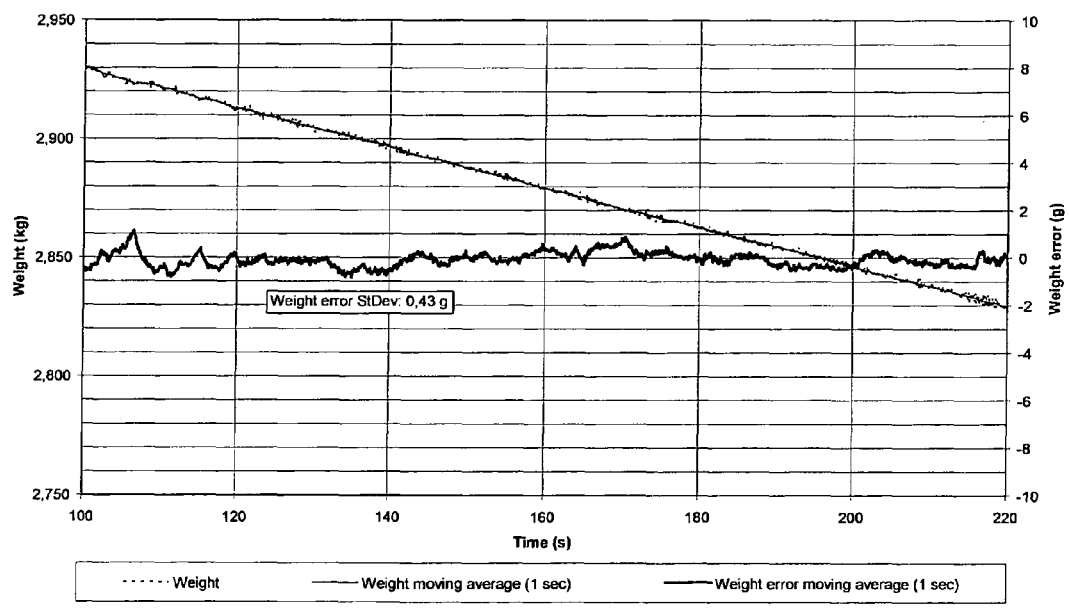
FIG. 8b - INVENTION

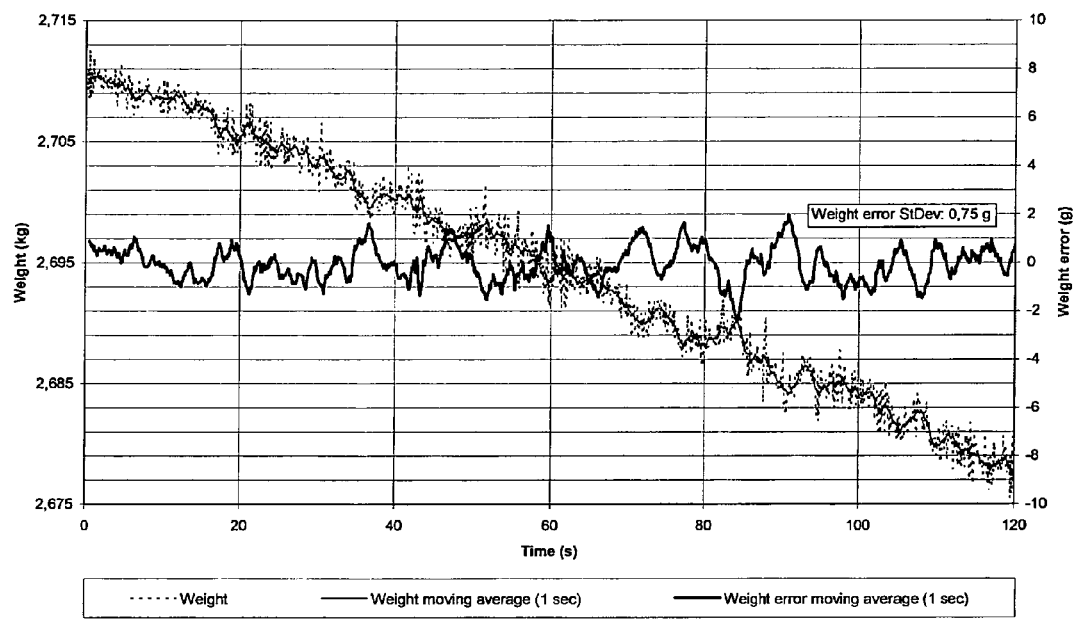
FIG. 9 - INVENTION

PROCESS AND APPARATUS FOR CONTINUOUSLY PRODUCING AN ELASTOMERIC COMPOSITION

CROSS REFERENCE TO RELATED APPLICATION

This application is a national phase application based on PCT/EP2007/007331, filed Aug. 20, 2007, the content of which is incorporated herein by reference.

BACKGROUND OF THE INVENTION

The invention relates generally to the art of producing elastomeric compositions primarily, but not exclusively, intended for use in the production of tires.

More specifically, the present invention relates to a process and apparatus for continuously producing an elastomeric composition by means of at least one extruder and at least one dosing device for dosing at least one ingredient.

BACKGROUND ART

Conventionally, the production of elastomeric compositions (in the following also indicated as "rubber mixtures") is performed batchwise by means of internal mixers, usually Banbury mixers having two counter-rotating rotors which exert an intensive mixing action to masticate the rubber ingredients and to incorporate and thoroughly disperse therein the other ingredients, including fillers, lubricating aids, curatives and auxiliary substances.

The compounding process using internal mixers shows many drawbacks, particularly a poor heat dissipation and thus a scarce temperature control, mainly due to an unfavorable ratio between material volume and mixer surface area. To improve dispersion in the rubber base, the various ingredients, and particularly the fillers, are incorporated into the rubber base in batches distributed in a plurality of mixing operations separated by cooling and stocking steps. Temperature sensitive ingredients, such as cross-linking agents and accelerators, are added only during the final mixing step after cooling the rubber mixture below a predetermined temperature (usually below 110° C.) to avoid scorching.

Therefore, the compounding process in internal mixers, although still remaining the most widely used mixing process in the rubber industry, is time and energy consuming and does not guarantee an effective control on the characteristics of the resulting elastomeric compositions, particularly as far as an homogeneous dispersion of fillers into the rubber base is concerned. Variation in the added amounts of individual ingredients, timing of addition and discharge from the mixers, initial temperature of the raw materials, and fluctuations of shear forces inside the material during mixing, all contribute to batch-to-batch variation.

To overcome the limitations of the discontinuous processes, many efforts have been made in the rubber industry to set up continuous compounding processes, based on extrusion techniques analogous to those commonly employed in the processing of thermoplastic polymer materials. Continuous mixing processes carried out by means of an extruder should improve uniformity in the rubber mixture characteristics, better thermal control resulting from improved surface-to-mass ratios, and possible development of highly automated operations. For an overview on this subject see, for example, the article "A tale of continuous development" by H. Ellwood, published in *European Rubber Journal*, March 1987, pages 26-28.

Exemplary processes and apparatuses for continuously producing elastomeric compositions are disclosed, inter alia, by U.S. Pat. Nos. 5,158,725 and 5,374,387.

U.S. Pat. No. 5,158,725 discloses a method for continuously producing elastomer compositions which comprises: feeding an elastomer into a twin-screw extruder; feeding at least one filler, oil and/or other elastomers into the extruder; mixing the ingredients to provide a homogeneous mixture which is maintained at a Mooney viscosity ML(1+4) at 100° C. between 20 and 250 during mixing; discharging the resulting mixture from the extruder. After leaving the extruder, the compounded rubber may be extruded through a die, calendered into sheets, strips or strands, or may be pelletised. The continuous method is less expensive than the multi-step batchwise processes currently used in the art and requires less manpower and less material handling. Moreover, improved dispersion and homogeneity of the resulting elastomeric compositions would result.

U.S. Pat. No. 5,374,387 describes a process for continuously producing elastomeric compositions using a twin-screw extruder, which comprises the following sequential steps. In a first step, an elastomeric material is added, sheared and heated to a first operating temperature (typically from 130° C. to 220° C.) while reducing viscosity within a first mixing zone of the extruder. Then, the elastomeric material is transferred to a second mixing zone where it is added with at least a first portion of a reinforcing filler and processing aid, while simultaneously cooling the rubber mixture to a second operating temperature (typically from 110° C. to 160° C.). The resulting mixture is then passed to an optional third mixing zone, where small constituent chemicals, such as adhesion promoters, anti-ozonants, color additives, fire retardants and the like, are introduced into the rubber mixture. Preferably, in said third mixing zone a second portion of the reinforcing filler and processing aid is added so as to reach a third operating temperature (typically from 85° C. to 130° C.). Then, in a fourth mixing zone the rubber mixture is supplemented with the vulcanization agent at a fourth operating temperature (typically from 115° C. to 150° C.). The mixture flow is then directed through a delivery zone (fifth zone) wherein the mixture flow is extruded into the desired form through some sort of die slot or the like.

In continuous processes of this kind, the various components of the rubber composition are continuously and individually dosed into the extruder, preferably in the form of particulate materials and/or liquids by means of dosing devices such as loss-in-weight feeders also known as gravimetric feeders.

In the Applicant's view, one of the most critical steps in the production of an elastomeric composition by means of a continuous process is that of reliably and repeatably dosing into the rubber base the various ingredients of the rubber composition and, particularly, the so-called "minor ingredients". The "minor ingredients" are those components different from rubbers, reinforcing fillers and plasticizing agents which are added to modify and/or to improve the characteristics of the elastomeric compositions. Examples of minor ingredients are vulcanizing agents, vulcanization accelerators and retardants, protective agents and hardening resins. The minor ingredients are very numerous (usually at least 5-15 in a single rubber mixture), are to be dosed in small amounts (generally not greater than 5% by weight with respect to the total weight of the rubber mixture) and their type and amounts vary according to the elastomeric composition to be produced.

The criticality of the dosing operation of the minor ingredients is essentially related to the fact that comparatively small amounts thereof should be dosed very accurately as smoothly as possible, since even minor fluctuations in the dosed amounts of the minor ingredients could trigger great changes in the properties of the final rubber mixture.

In order to improve the accuracy of this dosing operation, it has been proposed in the art, as disclosed for example by International patent application WO 03/009989 in the name of the present Applicant, to use the minor ingredients in the form of subdivided products including at least one of the minor ingredients dispersed in a thermoplastic binding agent. In this way, the subdivided products may be continuously dosed with greater accuracy into the extruder.

SUMMARY OF THE INVENTION

Although the use of minor ingredients in the form of subdivided products has reduced the handling problems of this kind of ingredients and improved to a certain extent the accuracy of the metering operations, the Applicant has noticed that the problem of ensuring a correct dosage of the minor ingredients still remains outstanding, particularly for overall flow rates of the minor ingredients lower than 1-2 kg/h.

The known dosing devices, in fact, are generally controlled by programmable logic controllers (PLC) which operate the dosing device in closed loop fashion using the inputs of a weight sensor (usually a load cell) operable to sense the weight value of the ingredient stored in the dosing device and implement a control law, typically a proportional, integral, derivative (PID) control with the aim of maintaining as constant as possible the mass flow rate of the minor ingredient calculated on the basis of the readings received from the weight sensor. To this aim, PID controllers generally receive sensor inputs indicative of the dosing device status (e.g. speed of a dosing screw, weight of material within the device at given times) which are then used to calculate a mass flow rate that is compared with desired mass flow rate values (e.g., set point values) to derive an error value. PID controllers provide then such control output signals which are proportional to the error, the integral of the error, and/or the derivative of the error, wherein PID coefficients kp, ki, and kd are set to provide relative weighting for the proportional, integral, and derivative components of the control output signal.

In order to try to maintain as constant as possible the mass flow rate of the minor ingredient, the PID controller of the dosing device, however, has to be operated so as to calculate the mass flow rate by considering the readings received from the weight sensor at fairly ample time intervals, in the order of 15-20 seconds, in order to avoid incontrollable fluctuations of the calculated mass flow rate values due to the inevitable noises inherent in the operation of the dosing system (such as, for example, the noise due to vibrations induced in the surroundings, the noise due to changes in the actual velocity of the dosing screw, and so on).

In so doing, however, conventional dosing devices operated by PID controllers are unable to cope with the problem of a high dosing variability, related to the aforementioned inevitable noise inherent in the operation of the dosing system, which is particularly relevant for overall flow rates of the ingredients to be dosed lower than 1-2 kg/h.

Conventional dosing devices operated by PID controllers, furthermore, have proven to be unable to properly take into account the phenomenon of the so-called "slides", i.e. the random fall of lumps of unpredictable weight from the bulk of the granular or powdery material charged in the dosing device, which slides may alter in a significant way the actual quantity of minor ingredient dosed into the rubber mixture being fed to the extruder.

The PID controllers which aim at maintaining constant the mass flow rate of the ingredient, in fact, either do not sense at all the slide due to the filtering of noises made upstream thereof, or do "interpret" the lack of weight loss due to a sudden fall of a slide as a lack of proper dosage and thus impart a velocity increase to the dosing screw: the consequence is that the dosing system will operate from that point in time onwards along an actual weight loss profile parallel to but different from the desired theoretical weight loss profile (or dosing profile) of the feeder giving rise to an undesired drift phenomenon.

In other words, the PID controllers which aim at maintaining constant the mass flow rate of the ingredient are not only unable to cope with the slides problem, but also drive the dosing system towards steady dosing conditions which depart from the desired ones with the overall consequence that the dosage is non-uniform and does not correspond at all to the expected one especially at the limited mass flow rates of the greater part of the minor ingredients (i.e. below 1-2 kg/h).

Also, conventional PID controllers require tuning of the various control coefficients (e.g., kp, ki, and kd) associated therewith, in order to achieve good control. However, tuning these coefficients may be beyond the capabilities of the end user of the manufacturing apparatus including the dosing device. The tuning capabilities provided by kp, ki, and kd in a PID controller, furthermore, are not sufficient to optimize the control operations of the dosing devices, where non-linearities, high order dynamics, highly variable noises, and other indeterminate conditions are present.

In addition, the PID controllers of known type based on the control of the mass flow rate of the ingredient are unable to control in a proper way the dosage of ingredients from dosing devices equipped with so-called anti clogging devices, usually blade rotors rotatably mounted in a storage container housing the ingredient to be dosed, which aim at avoiding the formation of clots and aggregates within the mass of the granular or powdery material which could prevent a regular dosage of the material. The anti clogging devices, in fact, introduce in the dosing system vibrations having an entity which affects the weight sensor in a significant way (mainly when the material to be dosed is in granular form) thus rendering the PID controller incapable of reliably controlling the dosing operations.

Finally, the known PID controllers based on the control of the mass flow rate of the ingredient are unable to operate properly whenever the storage container of the dosing device should be recharged with material (operation know as "refill" of the container), since in this circumstance the PID controller would sense a "negative" value of the mass flow rate which would impair the subsequent dosage control.

In this case, the dosing operations are usually carried out by switching off the PID controller and by setting the velocity of the dosing screw at a value determined as the weighted moving average of the speed values within a predetermined time period, for example 1-5 minutes, preceding the refill of the storage container. In so doing, however, the dosing device delivers an amount of ingredient which is almost invariably greater than the desired value, since the speed of the dosing screw has been set on the basis of a condition of the storage container (almost empty) in which the speed of the screw is normally higher due to the reduced weight of material, instead of being set on the basis of the actual storage condition (container almost full with a lower velocity of the dosing screw).

Within the framework of the above-noted problem of reliably and repeatably dosing the various ingredients, and particularly the minor ingredients, into the rubber base in the continuous production of an elastomeric composition, the Applicant has perceived that in order to arrive at a satisfactory solution the "control logic" of the dosing step and, particularly of the dosing devices of the minor ingredients, based on the control of the mass flow rate of the ingredient to be dosed has to be abandoned in order to achieve satisfactory results.

More specifically, the Applicant has perceived that the dosing step should not be controlled by trying to maintain constant the mass flow rate of the ingredient fed to the extruder, but rather by operating the dosing device on the basis of the current and expected weight losses of the minor ingredient measured and predicted within a specified time period.

Accordingly, the Applicant has devised a process for the continuous production of elastomeric compositions in which any ingredient and particularly the minor ingredients can be more accurately dosed and continuously fed into at least one extruder in a reliable and repeatable manner by regulating the dosing step of the ingredient fed into the extruder on the basis of:

i) actual weight values of the ingredient measured at dosing instants of an evaluation time period of predetermined duration preceding a given dosing instant;

ii) expected weight values of the ingredient calculated for corresponding dosing instants of said evaluation time period preceding said dosing instant; and iii) expected weight values of said at least one ingredient calculated for a prediction time period of predetermined duration following said dosing instant;

so as to minimize:

a prediction weight error between actual weight values measured during said prediction time period and said expected weight values calculated for said prediction time period, and a model weight error between actual weight values measured during said prediction time period and theoretical weight values of said at least one ingredient corresponding to a target weight loss of said at least one ingredient.

Therefore, in a first aspect the present invention relates to a process for continuously producing an elastomeric composition, comprising the steps of:

a) providing at least one extruder comprising a housing, at least one screw rotatably mounted in said housing, said housing including at least one feed opening and a discharge opening;

b) setting a target weight loss for at least one ingredient to be dosed;

c) dosing into said at least one extruder said at least one ingredient;

d) mixing and dispersing said at least one ingredient into at least one elastomer by means of said at least one extruder;

e) extruding the resulting elastomeric composition through said discharge opening;

wherein step c) of dosing into said at least one extruder said at least one ingredient is regulated on the basis of:

i) actual weight values of said at least one ingredient measured at dosing instants of an evaluation time period of predetermined duration preceding a given dosing instant;

ii) expected weight values of said at least one ingredient calculated for corresponding dosing instants of said evaluation time period preceding said dosing instant; and iii) expected weight values of said at least one ingredient calculated for a prediction time period of predetermined duration following said dosing instant;

so as to minimize:

a prediction weight error between actual weight values measured during said prediction time period and said expected weight values calculated for said prediction time period, and a model weight error between actual weight values measured during said prediction time period and theoretical weight values of said at least one ingredient corresponding to said target weight loss of said at least one ingredient.

The Applicant found that if the dosing step of the desired ingredient is no longer controlled on the basis of the mass flow rate but rather on the basis of a prediction weight error between the actual and the expected weight values and of a model weight error between the actual and the theoretical weight values within a prediction time period of predetermined duration following a given dosing instant, the process of the invention is advantageously capable to effectively cope with the dosing problems outlined above which affect the processes of the prior art.

Most advantageously, the process of the invention allows to achieve the following advantages even at limited mass flow rates (for example below 1-2 kg/h) of the ingredient to be dosed:

i) remarkably improve the accuracy and repeatability of the dosing step by taking into account at each dosing instant both the dynamic characteristics of the dosing device and the actual amounts of the ingredient dosed into the extruder coping substantially in real time with any dosing perturbations of the ingredient such as the aforementioned slides;

ii) deliver an average mass flow rate of the ingredient dosed into the extruder close to the theoretical one without any drift phenomena towards higher mass flow rates as are usually caused by the PID controllers of the prior art in the presence of slides;

iii) dose the ingredient into the extruder with smaller dosing variations evidenced, as will be illustrated in further detail hereinbelow, by a drastic decrease of the standard deviation of the weight error values between the actual weight values measured during the dosing period and the theoretical weight values related to the desired theoretical mass flow rate to be achieved during the dosing period.

Most advantageously, furthermore, the dosing step of the desired ingredient, such as the minor ingredients, may be carried out according to the invention so as to recover within a reduced time period the dosing perturbation caused by the slides, and particularly to recover such a perturbation within a time period which allows the extruder to homogeneously distribute any surplus amounts of the dosed ingredients, notably of the minor ingredients, within the mass of the other ingredients.

Additionally, the process of the invention advantageously allows to use dosing devices provided with anti clogging devices and to cope with the "refill" transient conditions while ensuring a reliable and repeatable dosage of the ingredient.

For the purposes of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

According to a preferred embodiment of the invention, the expected weight values of said at least one ingredient are calculated for the prediction time period following the dosing instant on the basis of:
  i) a dynamic model of the dosing device;
  ii) a trend of a model weight error between the actual weight values measured during said evaluation time period preceding said dosing instant and the theoretical weight values calculated during said evaluation time period;
  iii) a trend of expected weight values of said at least one ingredient calculated during said evaluation time period at a preceding dosing instant;
  iv) a current state of the dosing device including a regulation state of the dosing device at said dosing instant.

According to a preferred embodiment of the invention, the trend of the expected weight values of said at least one ingredient is calculated during said evaluation time period at a dosing instant immediately preceding the given dosing instant.

According to a preferred embodiment of the invention, the dosing step c) of said at least one ingredient into said at least one extruder comprises the steps of:
  c1) measuring at a given dosing instant an actual weight of said at least one ingredient; and
  c2) comparing the actual weight value of said at least one ingredient measured at said dosing instant with an expected weight value calculated for the dosing instant and with a theoretical weight value for the dosing instant so as to calculate for each dosing instant:
    i) a model weight error between said actual weight and said theoretical weight value;
    ii) a prediction weight error between said actual weight and the expected weight value.

According to a preferred embodiment of the invention, the dosing step c) of said at least one ingredient into said at least one extruder comprises the step of:
  c3) updating at each dosing instant the calculated trend of the model weight error and the calculated trend of expected weight values for the prediction time period following the dosing instant on the basis of the model weight error and of the prediction weight error calculated in step c2).

According to a preferred embodiment of the invention, the dosing step c) of said at least one ingredient into said at least one extruder comprises the step of:
  c4) updating the dynamic model of the dosing device on the basis of said model weight error and said prediction weight error values calculated in step c2).

Within the framework of this preferred embodiment, the dosing step c) of said at least one ingredient into said at least one extruder preferably comprises the step of:
  c5) regulating the dosing output of the dosing device so as to minimize said prediction weight error and said model weight error within said prediction time period on the basis of the updated dynamic model of the dosing device.

According to a preferred embodiment of the invention, any one of the aforementioned steps c1)-c5), still more preferably all of them, is carried out at a predetermined sampling period T or, in other words, the activity or event involved in each of said steps is repeated at a predetermined sampling frequency f=1/T.

Within the framework of this preferred embodiment, this predetermined sampling period T is comprised between 1/40 second and 1 second (weight sampling every 25 ms-1 s, sampling frequency f comprised between 40 and 1 events per second), more preferably between 1/20 second and 1/2 second (weight sampling every 50 ms-500 ms, sampling frequency f comprised between 20 and 2 events per second) and, still more preferably, is of 1/10 second (weight sampling every 100 ms, sampling frequency f of 10 events per second).

In this way, it is advantageously possible to control the dosing in an optimal way minimizing the standard deviation of the weight error values.

According to a preferred embodiment of the invention, the prediction time period is comprised between 5 and 30 seconds, more preferably between 10 and 25 seconds and, still more preferably, is of 20 seconds.

In this way, it is advantageously possible to carry out the aforementioned prediction step in an optimal way thereby ensuring that the dosing operations are carried out in the most accurate and repeatable manner minimizing the standard deviation of the weight error values.

According to a preferred embodiment of the invention, the aforementioned evaluation time period is comprised between 5 and 30 seconds, more preferably between 10 and 25 seconds and, still more preferably, is of 20 seconds.

In this way, it is advantageously possible to carry out the dosing operations in the most accurate and repeatable manner minimizing the standard deviation of the weight error values.

According to a preferred embodiment of the invention, the dosing device is a gravimetric or loss-in-weight feeder including a dosing screw.

According to a preferred embodiment of the invention, the dynamic model of the dosing device comprises an expression representative of the dynamic behavior of the dosing device.

Preferably, said expression is a polynomial expression having the following formula:

$$y(t)=[b_0 u(t-kdt)+b_1 u(t-(k-1)dt)+\ldots+b_n u(t-(k-n)dt)]/[a_1 y(t-dt)+a_2 y(t-2dt)+\ldots+a_n y(t-ndt)]+[e(t)+c_1 e(t-1dt)+c_2 e(t-2dt)\ldots+c_n e(t-ndt)]/[a_1 y(t-dt)+a_2 y(t-2dt)+\ldots+a_n y(t-ndt)]$$

wherein:
  y(t) is the weight of said at least one ingredient at instant t;
  u is the speed of a dosing screw of the dosing device;
  $b_0, b_1, \ldots, b_n$ are deterministic moving average coefficients of the dynamic model;
  $a_1, a_2, \ldots, a_n$ are autoregressive coefficients of the dynamic model;
  dt is the sampling time;
  k is the transport delay time of the dosing screw;
  e is the Gaussian white noise of the dynamic model;
  $c_1, c_2, \ldots, c_n$ are stochastic moving average coefficients of the dynamic model.

In the aforementioned polynomial expression, the coefficients $b_0, b_1, \ldots, b_n$ and $a_1, a_2, \ldots, a_n$ belong to the deterministic part of the dynamic model and are related to the dynamic response of the dosing device.

Preferably, the coefficients $b_0, b_1, \ldots, b_n$ and $a_1, a_2, \ldots, a_n$ are determined using a recursive least squares procedure.

In the aforementioned polynomial expression, the coefficients $c_1, c_2, \ldots, c_n$ belong to the stochastic part of the dynamic model and are related to the noises which may occur during the dosing operations.

Within the framework of this preferred embodiment of the invention, all the coefficients and parameters of the dynamic model of the dosing device are experimentally determined on the basis of the specific characteristics and kind of the dosing device (motor means, dosing screw, mass and elasticity characteristics of the container in which the ingredient is stored and of its support, . . . ) according to procedures well known to those skilled in the control and modeling art.

In a preferred embodiment, the dosing step c) of the process of the invention comprises temporarily omitting the aforementioned regulation for a time period of predetermined duration if the actual weight value of said at least one ingredient measured at a given dosing instant exceeds a predetermined threshold value.

In this way, the process of the invention is advantageously capable to take into account and minimize the effects of the so called "refill" operations.

The inventors, in fact, have observed that whenever the actual weight value of the at least one ingredient measured at a given dosing instant exceeds in a significant manner the expected weight value of the ingredient at the dosing instant, a dosing anomaly is taking place the nature of which may be determined by assessing within a time period of predetermined duration whether the actual weight of the dosed ingredient returns or not below the aforementioned threshold value.

Preferably, said predetermined threshold value is equal to or greater than 20% of the difference between the actual weight value and the expected weight value of the ingredient at the dosing instant.

In the present context, this time period of predetermined duration may have different durations and is defined as "fault period" if it has a duration between 3 and 10 seconds or as "oblivion period" if it has a duration equal to or greater than the sum of said fault period and twice the prediction time period.

Within the framework of this preferred embodiment, the dosing step c) of the process of the invention therefore comprises re-establishing the regulation after a fault period comprised between 3 and 10 seconds if the actual weight value of said at least one ingredient measured at the given dosing instant returns to a value lower than said threshold value during said fault period.

On the other hand, if the actual weight value of said at least one ingredient measured at the given dosing instant remains equal to or greater than said threshold value during said fault period, the dosing step c) of the process of the invention comprises re-establishing the regulation after an oblivion period equal to or greater than the sum of said fault period and twice the prediction time period.

Preferably, the aforementioned oblivion period is comprised between 13 and 70 seconds, more preferably between 20 and 60 seconds and still more preferably is of 40 seconds.

The inventors, in fact, have observed that an oblivion period of this duration allows to properly take into account of the new weight of the container of the ingredient to be dosed subsequent to a refill operation and to start again the regulation of the dosing operations when the transient condition consequent to the refill operation are definitively over by correctly minimizing the prediction weight error between the actual and the expected weight values within the aforementioned prediction time period.

According to a preferred embodiment of the invention, the aforementioned at least one ingredient is a minor ingredient of the elastomeric composition different from elastomers and fillers.

Minor ingredients suitable for use in the process of the present invention may be selected, for instance, from:

(a1) crosslinking agents, such as:
sulfur (usually in a soluble crystalline form or in a insoluble polymeric form, optionally dispersed in an oily phase); sulfur donors (e.g. alkylthiuram disulfides); organic peroxides;

(a2) crosslinking accelerators, such as:
thiazoles, sulfenamides, guanidines, thiurams, dithiocarbamates, amines, xanthogenates;

(a3) synthetic resins, such as alpha-methylstyrene resins, cumarone resins;

(a4) crosslinking activators, such as zinc compounds (e.g. ZnO, $ZnCO_3$, fatty acid zinc salts);

(a5) crosslinking retardants, such as carboxylic acids, phthalimide derivatives, diphenylamine derivatives;

(a6) adhesion promoters, such as hexamethylenetetramine (HMT), resorcinol;

(a7) protective agents, such as aromatic diamines (e.g. N-(1, 3-dimethylbutyl)-N'-p-phenylenediamine (6PPD)), dihydroquinoline derivatives, imidazole derivatives;

(a8) coupling agents, such as coupling agents for silica, particularly sulfur-containing hydrolyzable silanes (e.g. 3,3'-bis(triethoxysilylpropyl)tetrasulfide (TESPT));

(a9) condensation catalysts, such as metal carboxylates (e.g. dibutyltin dilaurate (DBTL)).

The above list is given only to illustrate some examples of the most common minor ingredients used in rubber mixtures, particularly in rubber mixtures for tires, and shall not be intended as limitative of the scope of the present invention.

For the purposes of the invention, the minor ingredients may be in any particulate free-flowing form suitable for a proper handling, e.g. in the form of powder, granules, pellets, beads, pearls and the like, having average dimensions generally of from 0.5 mm to 5 mm, preferably from 1 mm to 3 mm.

For the purposes of the invention, the minor ingredients may be dosed as such or in the form of a subdivided product including said at least one minor ingredient dispersed in at least one thermoplastic binding agent or other suitable carrier.

According to a preferred embodiment of the invention, said at least one minor ingredient is in the form of a subdivided product including said at least one minor ingredient dispersed in at least one thermoplastic binding agent.

In this way, the following advantageous technical effects may be achieved:
possibility of an automatic conveying of the minor ingredient to the dosing device by means of a pneumatic conveying line from storage to the dosing device;
possibility of imparting free-flowing properties and high dimensional regularity and stability to the subdivided product even upon intense compression and/or friction stresses, such as those occurring in a pneumatic conveying line;
possibility of ensuring a pneumatic transportation and an accurate refilling of the minor ingredient, substantially without formation of fine powders and undesired changes in shape and/or dimensions of the granules;
possibility of remarkably improving the dispersion of the minor ingredient into the rubber base, without causing any significant changes in the properties of the final elastomeric composition, thanks to the melting characteristics of the thermoplastic binding agent which could act as a processing aid.

Within the framework of this preferred embodiment of the invention, the subdivided product preferably contains from 40% to 98% by weight, more preferably from 50% to 95% by weight, even more preferably from 70% to 85% by weight, of said at least one minor ingredient, with respect to the total weight of said product.

In this way, it is possible to achieve both optimal mechanical characteristics of the subdivided product ensuring an automatic conveying thereof without any loss of the minor ingredient or formation of powders, and optimal processing characteristics of the subdivided product during its manufacture.

According to a preferred aspect, the thermoplastic binding agent has a melting temperature (Tm) not lower than 40° C., and preferably comprised between 50° C. and 120° C. The melting temperature may be determined according to known techniques, e.g. by Differential Scanning Calorimetry (DSC).

More preferably, the thermoplastic binding agent comprises a polymer selected from:

(i) ethylene homopolymers or copolymers of ethylene with at least one aliphatic or aromatic alpha-olefin, and optionally with at least one polyene;

(ii) copolymers of ethylene with at least one ethylenically unsaturated ester;

(iii) polymers obtained by metathesis reaction of at least one cycloalkene;

or mixtures thereof.

Suitable thermoplastic binding agent and further ingredients of the subdivided products including at least one minor ingredient are described in more detail in the aforementioned International patent application WO 03/009989 the content of which is herein incorporated by reference.

The process according to the present invention may be employed to produce a rubber mixture of any kind of elastomers, particularly of elastomers used in the tire industry. Generally, the elastomeric base may be selected from: diene elastomeric polymers and mono-olefin elastomeric polymers, or mixtures thereof.

Diene elastomeric polymers are generally of natural origin, or may be obtained by polymerization, in solution or in emulsion, of at least one conjugated diolefin, optionally with at least one monovinylarene in an amount not exceeding 50% by weight. Examples of diene elastomeric polymers are: cis-1,4-polyisoprene (either natural or synthetic, preferably natural rubber), 3,4-polyisoprene, poly-1,3-butadiene (in particular, high vinyl poly-1,3-butadiene having a content of 1,2-polymerized until of from 15% to 85% by weight), polychloroprene, optionally halogenated isoprene/isobutene copolymers, 1,3-butadiene/acrylonitrile copolymers, 1,3-butadiene/styrene copolymers, 1,3-butadiene/isoprene copolymers, isoprene/styrene copolymers, isoprene/1,3-butadiene/styrene terpolymers; or mixtures thereof.

As to mono-olefin elastomeric polymers, they may be selected from: copolymers of ethylene with at least one alpha-olefin having from 3 to 12 carbon atoms, and optionally with a diene having from 4 to 12 carbon atoms; polyisobutene; copolymers of isobutene with at least one diene. Particularly preferred are: ethylene/propylene copolymers (EPR); ethylene/propylene/diene terpolymers (EPDM); polyisobutene; butyl rubbers; halobutyl rubbers; or mixtures thereof.

The rubber mixture further comprises at least one reinforcing filler, such as: carbon black, silica, alumina, aluminosilicates, calcium carbonate, kaolin, titanium dioxide, or mixtures thereof. Particularly preferred are carbon black and silica, or mixtures thereof. The amount of the reinforcing filler may be generally of from 0.1 to 120 phr, preferably from 20 to 90 phr (phr=parts by weight per 100 parts by weight of elastomeric base).

To improve processability, at least one plasticizing agent is preferably added to the rubber mixtures. Preferably, the plasticizing agent is selected from mineral oils, vegetable oils, synthetic oils and the like, or mixtures thereof, for instance: aromatic oil, naphthene oil, phthalates, soybean oil, or mixtures thereof. The amount of the plasticizing agent preferably ranges from 2 to 100 phr, more preferably from 5 to 50 phr.

According to a further aspect, the present invention relates to an apparatus for continuously producing an elastomeric composition, comprising:

a) at least one extruder comprising a housing, at least one screw rotatably mounted in said housing, said housing including at least one feed opening and a discharge opening;

b) at least one dosing device operative to dose into said at least one extruder at least one ingredient, said dosing device being provided with a container for storing said at least one ingredient;

c) a weight sensor operative to measure actual weight values of said at least one ingredient stored in said container;

d) a control system for regulating the dosing output of said at least one dosing device so as to minimize a prediction weight error between actual weight values measured by the weight sensor (37) during a prediction time period of predetermined duration following said given dosing instant and expected weight values calculated by the control system for said prediction time period, and a model weight error between actual weight values measured by the weight sensor during said prediction time period and theoretical weight values of said at least one ingredient corresponding to a target weight loss of said at least one ingredient.

Most advantageously, the apparatus of the invention allows to achieve the technical effects illustrated above in connection with the continuous process of the invention, such as:

a) remarkably improve the accuracy and repeatability of the dosing step coping substantially in real time with any dosing perturbations of the ingredient such as the aforementioned slides;

b) achieve even at limited mass flow rates (for example below 1-2 kg/h) of the ingredient to be dosed:

b1) an average mass flow rate close to the theoretical one without any drift phenomena towards higher mass flow rates as are usually caused by the PID controllers of the prior art in the presence of slides;

b2) smaller dosing variations evidenced, as will be illustrated in further detail hereinbelow, by a drastic decrease of the standard deviation of the weight error values between the actual weight values measured during the dosing period and the theoretical weight values related to the desired theoretical mass flow rate to be achieved during the dosing period.

According to a preferred embodiment of the invention, the control system comprises:

d1) a dynamic model of the dosing device comprising an expression representative of the dynamic behavior of the dosing device;

d2) a prediction component operative to calculate said expected weight values of said at least one ingredient stored in said container within said prediction time period;

d3) a regulator operative to regulate the dosing output of the dosing device so as to minimize said prediction weight error and model weight error.

According to a preferred embodiment of the invention, the prediction component is operative to calculate said expected weight values on the basis of:

i) the dynamic model of the dosing device;

ii) a trend of a model weight error between the actual weight values measured during said evaluation time period preceding a given dosing instant and the theoretical weight values calculated during said evaluation time period;

iii) a trend of expected weight values of said at least one ingredient calculated during the evaluation time period at a preceding dosing instant;

iv) a current state of the dosing device including a regulation state of the dosing device at the dosing instant.

According to a preferred embodiment, the control system of the apparatus of the invention further comprises an error function evaluator operative to:
i) calculate at a predetermined sampling period T said model weight error between the actual weight value measured by the weight sensor and the theoretical weight value;
ii) calculate at said predetermined sampling period T a prediction weight error between the actual weight value measured by the weight sensor and the expected weight value calculated by the prediction component.

According to a preferred embodiment, the control system of the apparatus of the invention further comprises a memory operative to store trends of the actual weight values and of the expected weight values at least during said evaluation time period and said prediction time period.

According to a preferred embodiment, the control system of the apparatus of the invention further comprises an updating component operative to update the dynamic model of the dosing device on the basis of said model weight error and said prediction weight error calculated at the predetermined sampling period T by the error function evaluator.

According to a preferred embodiment of the invention, the aforementioned regulator is operative to regulate the dosing output of the dosing device so as to minimize said prediction weight error and said model weight error within said prediction time period on the basis of an updated dynamic model of the dosing device.

As mentioned above, the dosing device is preferably a loss-in-weight or gravimetric feeder which preferably includes a dosing screw.

According to a preferred embodiment of the invention, the dynamic model of the dosing device is a model as described above with reference to the process for producing the elastomeric composition.

According to a preferred embodiment, in the apparatus of the invention the aforementioned control system further comprises a central processing unit provided with an interface for sending or receiving data to or from the dosing device and with a user interface or human-machine interface or operator console station sending or receiving data to or from a user, at which an operator enters data or set points for configuring, controlling and monitoring the dosing device.

Preferably, furthermore, the control system comprises an interface for driving the dosing screw of the dosing device, an actuator for controlling in DC the motor means which rotates the dosing screw of the dosing device, an interface for detecting the speed of said motor means, an interface for communicating with the weight sensor, such as a load cell, which measures the weight value of the ingredient stored in the dosing device as well as a human-machine interface (HMI) for configuring, controlling and monitoring the dosing system.

To this end, those skilled in the art may select the most suitable interface among those known in the art.

According to a preferred embodiment, the apparatus of the invention comprises a first extruder operative to produce an intermediate rubber mixture devoid of temperature-sensitive minor ingredients and a second extruder operative to produce a complete rubber mixture including said temperature-sensitive minor ingredients.

According to a preferred embodiment of the invention, the apparatus further comprises at least one pneumatic conveying line adapted to convey the desired ingredient, preferably a minor ingredient in the form of a subdivided product, from a storage bin to said at least one dosing device.

In this way, the apparatus of the invention advantageously allows to accurately meter and continuously feed the desired ingredient to the dosing device and then into the extruder.

According to a preferred embodiment of the invention, the apparatus further comprises at least one filtering body to filter the elastomeric composition discharged from said at least one extruder.

Additional features and advantages of the invention will become more clearly apparent from the detailed description of a preferred, but not exclusive, embodiment of a process and of an apparatus for continuously producing an elastomeric composition, in accordance with the present invention.

BRIEF DESCRIPTION OF THE DRAWINGS

Such a description will be set out hereinafter with reference to the accompanying drawings, given by way of indication and not of limitation, wherein:

FIGS. 3a-8b show exemplary graphs illustrating the weight decrease of three different exemplary minor ingredients during the dosing operations of a dosing device operated using a control system and methodologies of the production process in accordance with the invention and operated using a control system and methodologies of a production process in accordance with the prior art;

FIG. 9 shows exemplary graphs illustrating the weight decrease of an exemplary minor ingredient during the dosing operations of a dosing device, with anti clogging device switched on, operated using a control system and methodologies of the production process in accordance with the invention.

DETAILED DESCRIPTION OF THE PRESENTLY PREFERRED EMBODIMENTS

Figure 1A:
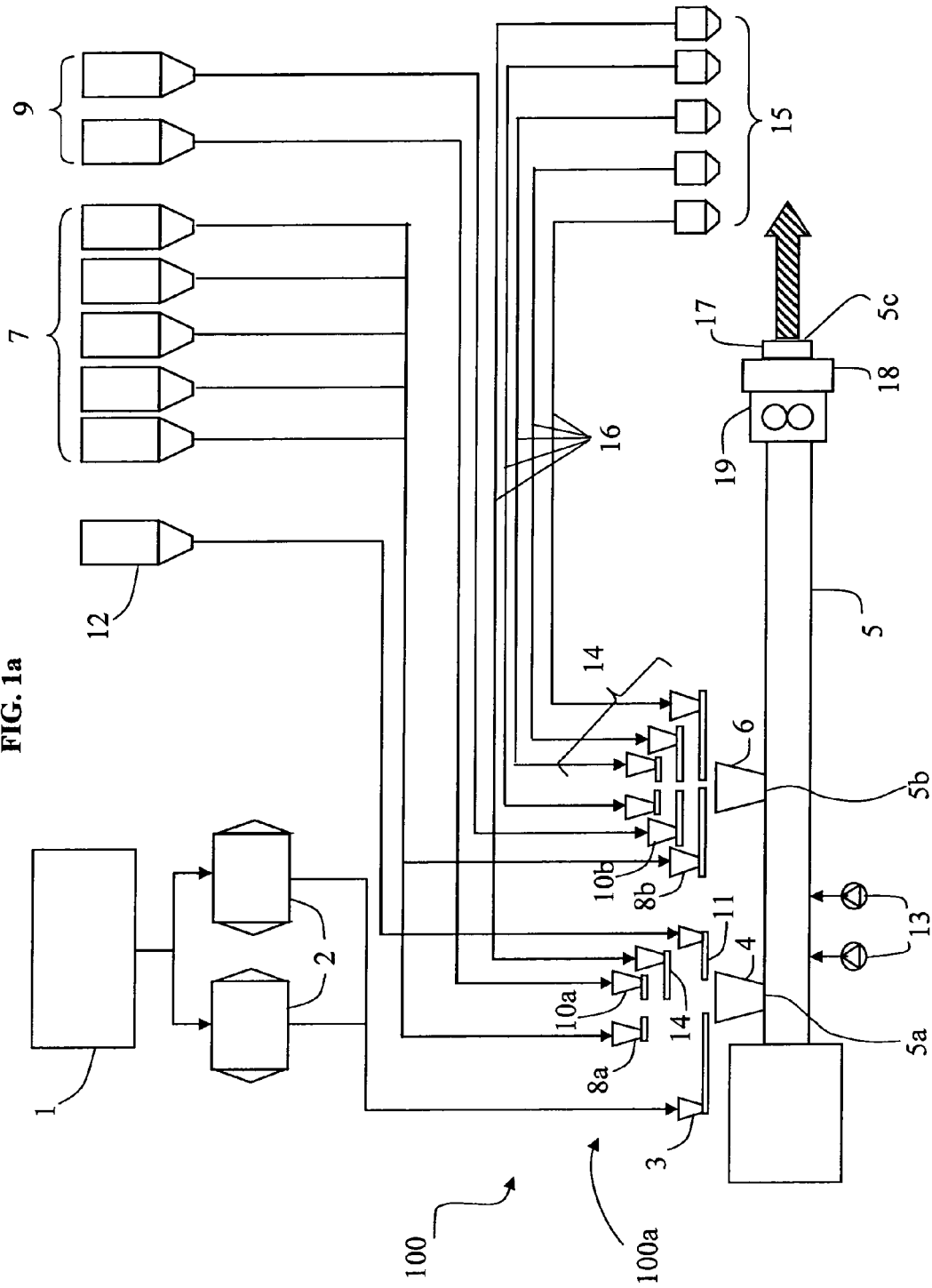
FIG. 1a is a schematic diagram of the first part of an apparatus for continuously producing an elastomeric composition according to the present invention, wherein an intermediate elastomeric composition is produced.
Figure 1B:
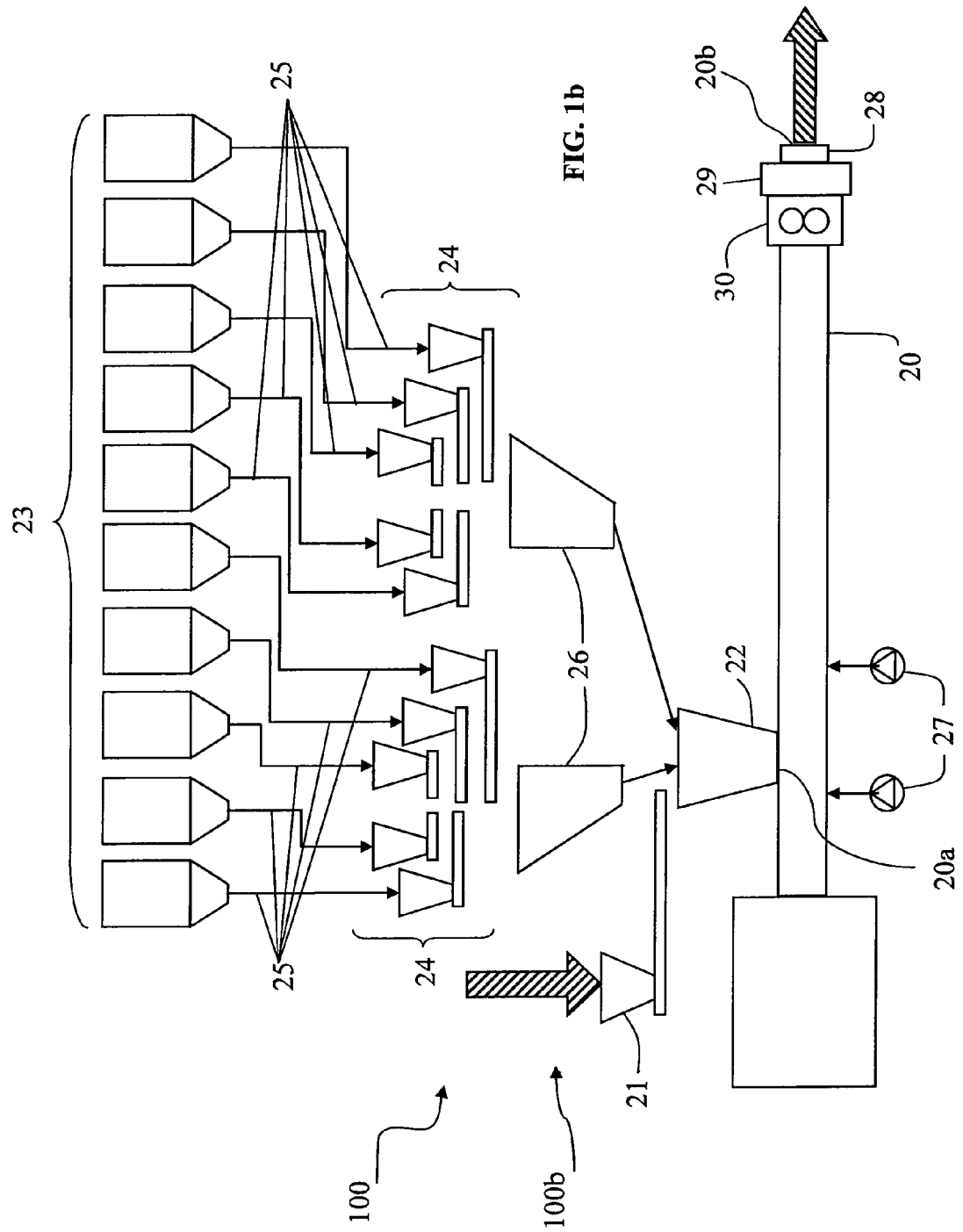
FIG. 1b is a schematic diagram of a second part of an apparatus for continuously producing an elastomeric composition according to the present invention, wherein a final curable elastomeric composition is produced starting from the intermediate elastomeric composition.

With reference to FIGS. 1a and 1b, an apparatus according a preferred embodiment of the invention for continuously producing an elastomeric composition is generally indicated at 100.

More specifically, FIG. 1a illustrates a first part 100a of the apparatus 100 in which an intermediate rubber mixture not including temperature sensitive ingredients is produced. The first part 100a of the apparatus 100 includes a rubber grinder 1 wherein rubber base materials, which are usually provided by manufacturers in bales, are comminuted, e.g. by means of blades, in irregular particles (crumbs) of small size (about 3-50 mm as average dimensions) and rubber storage drums 2 wherein the rubber particles are continuously or stepwise slowly rotated to prevent re-agglomeration.

The rubber grinder 1 may be provided with a feeding device, conventional per se and not shown in the drawings, for dosing therein suitable amounts of an antisticking agent (e.g. chalk, silica, or other powders) capable to prevent agglomeration of the rubber crumbs before the same are fed to the storage drums 2.

Preferably, the apparatus 100 comprises at least two storage drums 2 which are alternately filled and discharged so as to obtain a continuous feeding of the rubber crumbs to a first extruder 5 provided downstream of the storage drums 2.

The first part 100a of the apparatus 100 further includes a conveying device, e.g. a conveyor belt, for transporting the rubber crumbs to a dosing device 3, for example of the gravimetric type, adapted to dose the rubber crumbs to a main feed hopper 4 of a first extruder 5. In a way known per se, the main feed hopper 4 communicates with a main feed opening 5a of the first extruder 5.

In the preferred embodiment illustrated, the first extruder 5 includes an additional feed hopper 6, communicating with an additional feed opening 5b of the extruder 5, adapted to introduce therein reinforcing fillers a portion of which may be fed and dosed using the main feed hopper 4. Advantageously, the use of the additional feed hopper 6 (as represented in FIG. 1a) allows to add the total amount of reinforcing fillers in portions at different points of the extruder 5, so as to improve dispersion of the fillers in the rubber base.

In the preferred embodiment illustrated, the apparatus 100 includes a first plurality of storage bins 7 of different types of carbon black, a second plurality of storage bins 9 of different types of silica as well as conveying devices, for example of the pneumatic type, for transporting the carbon black and the silica to respective dosing devices 8a, 8b and 10a, 10b.

The extruder 5 may also be provided with an additional dosing device 11 adapted to feed, from a corresponding storage bin 12, those rubbers which are available in powder form.

The first part 100a of the apparatus 100 further includes gravimetrically-controlled feeding pumps 13 adapted to introduce into the extruder 5 plasticizing oils and possibly other liquid ingredients, such as silica coupling agents (e.g. silanes) and adhesion promoters (e.g. cobalt salts).

In addition, the apparatus 100 comprises a plurality of dosing devices 14 mounted upstream of at least one of the feed hoppers 4, 6 of the extruder 5 and adapted to dose therein minor ingredients preferably in the form of subdivided products (e.g. granules).

In the preferred embodiment illustrated, the granules are conveyed to the dosing devices 14 from storage bins 15 by means of pneumatic conveying lines 16.

According to a preferred embodiment, each type of granular product containing a specific minor ingredient (or a predetermined mixture of different minor ingredients) is individually conveyed, metered and fed by means of a dedicated pneumatic conveying line 16 and a dedicated dosing device 14.

In this way, irregular feeding and inaccurate metering deriving from different densities of the granules are prevented, since granules of the same density are fed to the extruder 5. Alternatively, to reduce metering errors due to a scarce filling of the dosing devices 14, different granular products may be metered and fed by means of the same dosing device 14.

The minor ingredients to be fed to the first extruder 5 are generally those ingredients which are not temperature sensitive, and therefore cannot degrade and/or cause scorching and which do not interfere with reactions which may occur during the first mixing stage. Generally, all the minor ingredients are fed to the first extruder 5 except: crosslinking agents, crosslinking accelerators, crosslinking retardants, crosslinking activators and, in the case of silica-filled rubber mixtures, those minor ingredients, such as zinc derivatives (e.g. ZnO) and amine compounds, which can interfere with the silanisation reaction between the coupling agent and silica.

The first extruder 5 is conventionally provided with a mixing screw, not shown, a die 17 and a filtering body 18, for example a screen filter, adapted to filter the intermediate elastomeric composition or rubber mixture discharged from a discharge opening 5c of the first extruder 5 in order to eliminate possible aggregates, metal particles or other impurities.

Preferably, the first extruder 5 is also provided with a gear pump 19 mounted upstream of the filtering body 18 and adapted to impart to the extruded material a pressure sufficient to pass the filtering body 18.

Referring now to FIG. 1b, a second part 100b of the apparatus 100 in which the final elastomeric composition is produced, will now be illustrated.

The second part 100b of the apparatus 100 includes a second extruder 20, which is fed with the intermediate elastomeric composition discharged from the first extruder 5, wherein the elastomeric composition is completed with the temperature sensitive ingredients.

The transport of the intermediate elastomeric composition from the first to the second extruder may be performed according to any known method, and should preferably allow cooling down the intermediate elastomeric composition in order to avoid rubber scorching during the second mixing step carried in the second extruder 20. For example, the transport of the intermediate elastomeric composition from the first to the second extruder may be obtained by means of a "loose" connection, for instance by festoons of the intermediate elastomeric composition extruded in the form of a continuous strip or sheet. Preferably, the intermediate elastomeric composition is granulated, e.g. by passing it through a perforated die plate equipped with blades (not represented in the figures).

In the preferred embodiment illustrated, the second part 100b of the apparatus 100 includes a conveying device, e.g. conveyor belt (not shown), adapted to convey the intermediate elastomeric composition to a dosing device 21, for example of the gravimetric type, adapted in turn to dose the intermediate elastomeric composition into the second extruder 20 through a main feed hopper 22 communicating with a main feed opening 20a of the second extruder 20.

The second part 100b of the apparatus 100 also includes a plurality of storage bins 23 housing the minor ingredients necessary to complete the elastomeric composition. Preferably, these minor ingredients are in the form of subdivided products (e.g. granules) and the storage bins 23 are connected to respective dosing devices 24 by means of pneumatic conveying lines 25.

In the preferred embodiment illustrated, the dosing devices 24 of the minor ingredients in granular form are mounted upstream of intermediate feed hoppers 26 which collect the same and which feed the minor ingredients thus collected to the main feed hopper 22.

Preferably each type of granular product containing a specific minor ingredient (or a predetermined mixture of different minor ingredients) is individually conveyed, metered and fed by means of a dedicated pneumatic conveying line 25 and a dedicated dosing device 24. Alternatively, different granular products may be metered and fed by means of the same dosing device 24.

As said above, the minor ingredients to be fed to the second extruder 20 are generally those ingredients, necessary to complete the elastomeric composition, which are temperature sensitive, such as crosslinking agents, crosslinking accelerators and retardants, activating agents.

Similarly to the first extruder 5, the second extruder 20 is conventionally provided with a mixing screw, not shown, a die 28, communicating with a discharge opening 20b of the second extruder 20, and a filtering body 29, for example a screen filter, adapted to filter the elastomeric composition or rubber mixture discharged from the second extruder 20 in order to eliminate possible aggregates, metal particles or other impurities.

Preferably, the second extruder 20 is also provided with a gear pump 30 mounted upstream of the filtering body 29 and adapted to impart to the extruded material a pressure sufficient to pass the filtering body 29.

The second extruder 20 may be also provided with gravimetrically controlled feeding pumps 27 adapted to introduce into the extruder 20 additional plasticizing oils or other liquid ingredients, such as liquid resins (e.g. phenolic resins) and anti-reversion agents (e.g. silanes).

The pneumatic conveying lines 16, 25 of the apparatus 100 are connected to a pneumatic conveying system (not represented in the figures) which may be implemented according to techniques well known in the art. In general terms, a pneumatic conveying system is able to transport a subdivided product through a pipeline using the motive force of air (or any other gas) under a positive or negative pressure.

A pneumatic conveying system suitable for the present invention may operate in "dilute phase" or in "dense phase", namely with a low filling factor or with a high filling factor of the pneumatic line. In the case of a dilute phase conveying system, the product to be transported is suspended in the air stream and the conveying velocity is high (usually from 15 to 40 m/sec), while in a dense phase system the product slides through the pipeline rather than particles being fully suspended in the air stream, and the conveying velocity is low (usually not higher than 5-10 m/sec).

The pneumatic conveying system usually comprises a blower or a fan to deliver air into the pipeline (in the case of a positive pressure) or to suck air from the pipeline (in the case of a negative pressure), a feed device to entrain the product into the conveying air (e.g. a rotary valve) and a filter or air separator to remove the product from the air at the receiving device (e.g. a feed hopper).

Figure 2:
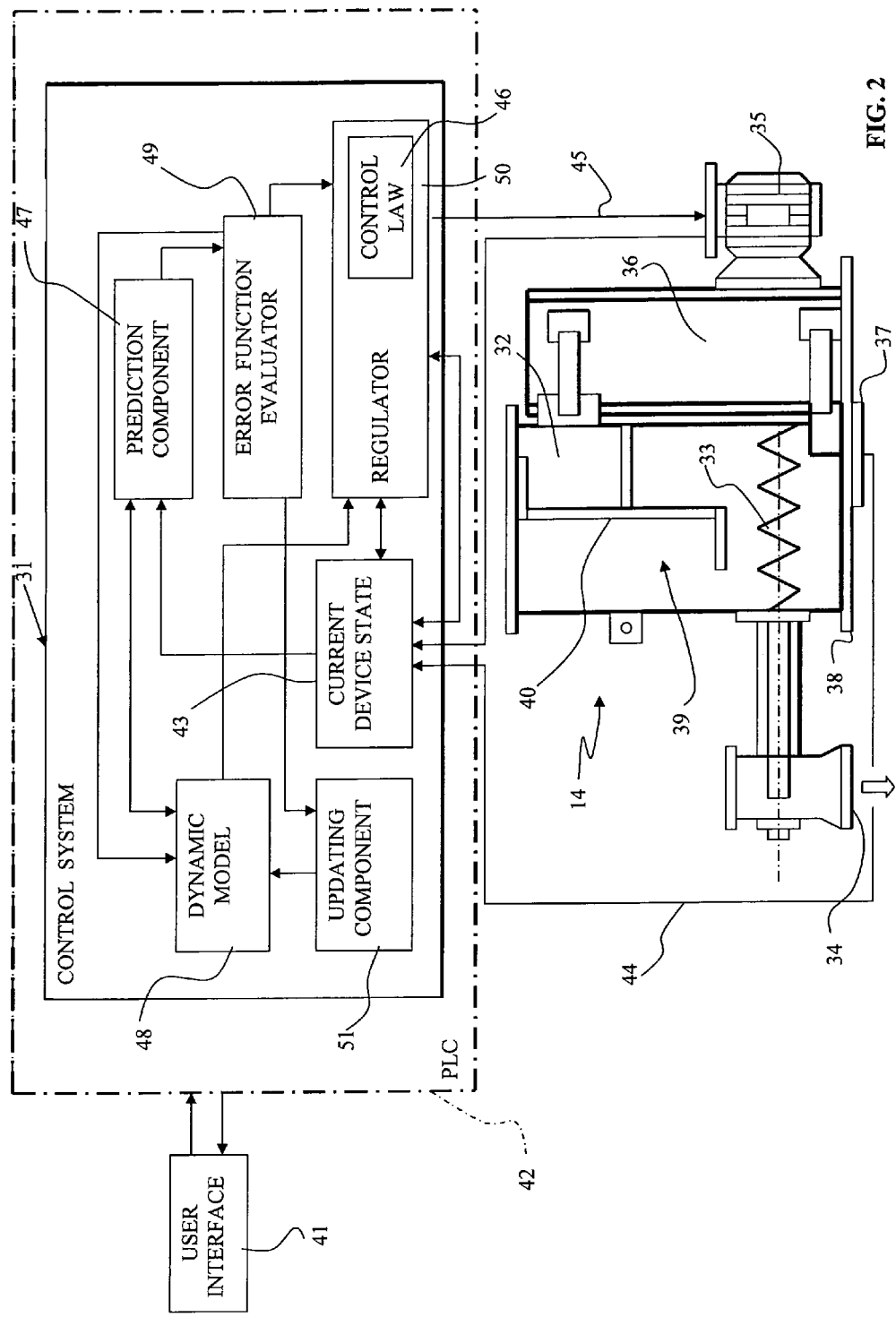
FIG. 2 is a schematic view in partial cross section illustrating a dosing device provided with an exemplary control system of an apparatus in accordance with the present invention.

Referring now to FIG. 2, an exemplary dosing device, for example one of the dosing devices 14 adapted to dose the minor ingredients into the first extruder 5, is illustrated. The dosing device 14 is operatively associated to a control system 31 in accordance with various aspects of the present invention, by which improved control of the dosing operations can be achieved.

Although illustrated and described hereinafter in the context of controlling the dosing operations of the minor ingredients, the invention can be employed to control the dosing operations of other ingredients into the extruders 5, 20 apart from those illustrated and described herein, and all such implementations are contemplated as falling within the scope of the invention and the appended claims.

The dosing device 14 is a so-called loss-in-weight feeder or gravimetric feeder and includes a container 32, for example a hopper, and at least one dosing screw 33, preferably a couple of dosing screws 33 (only one of which is visible in the drawings), adapted to transport metered amounts of the minor ingredient housed in the container 32 towards a dosing outlet 34. To this end, the dosing screws 33 are conventionally rotated by a motor 35 through the interposition of a reduction gear 36.

The dosing device 14 is further provided with a weight sensor 37, for example a load cell, operative to measure an actual weight value of the ingredient to be dosed and housed in the container 32.

The weight sensor 37 is mounted below a supporting frame 38 of the dosing device.

The dosing device 14 is further provided with an anti clogging device 39 adapted to prevent the formation of agglomerates within the material housed in the container 32.

In the preferred embodiment illustrated, the anti clogging device 39 comprises a rotor blade 40 rotated in a conventional way by the motor 35 through the interposition of the reduction gear 36.

In the preferred embodiment illustrated the control system 31 comprises:

a dynamic model 48 of the dosing device 14 comprising an expression representative of the dynamic behavior of the dosing device 14;

a prediction component 47 operative to calculate expected weight values of the ingredient (in this example the minor ingredient) stored in the container 32 within a prediction time period of predetermined duration following a given dosing instant;

a regulator 50 operative to regulate the dosing output of the dosing device 14 so as to minimize:

a prediction weight error between actual weight values measured by the weight sensor 37 during said prediction time period and expected weight values calculated by the prediction component 47 for the prediction time period, and a model weight error between actual weight values measured by the weight sensor 37 during the prediction time period and theoretical weight values of the ingredient corresponding to a target weight loss of the same.

According to the preferred embodiment illustrated, the dynamic model 48 of the dosing device 14 comprises an expression, preferably a polynomial expression, representative of the dynamic behavior of the dosing device.

Preferably, this polynomial expression has the following formula:

$$y(t)=[b_0 u(t-kdt)+b_1 u(t-(k-1)dt)+\ldots+b_n u(t-(k-n)dt)]/[a_1 y(t-dt)+a_2 y(t-2dt)+\ldots+a_n y(t-ndt)]+[e(t)+c_1 e(t-1dt)+c_2 e(t-2dt)\ldots+c_n e(t-ndt)]/[a_1 y(t-dt)+a_2 y(t-2dt)+\ldots+a_n y(t-ndt)]$$

wherein y(t) is the weight of the minor ingredient at instant t;

u is the speed of the dosing screws 33 of the dosing device 14;

$b_0, b_1, \ldots, b_n$ are deterministic moving average coefficients of the dynamic model 48;

$a_1, a_2, \ldots, a_n$ are autoregressive coefficients of the dynamic model 48;

dt is the sampling time;

k is the transport delay time of the dosing screws 33;

e is the Gaussian white noise of the dynamic model 48;

$c_1, c_2, \ldots, c_n$ are stochastic moving average coefficients of the dynamic model 48.

In the aforementioned polynomial expression, the coefficients $b_0, b_1, \ldots, b_n$ and $a_1, a_2, \ldots, a_n$ belong to the deterministic part of the dynamic model 48 and are related to the dynamic response of the dosing device 14.

Preferably, the coefficients $b_0, b_1, \ldots, b_n$ and $a_1, a_2, \ldots, a_n$ are experimentally determined using a recursive least squares procedure.

In the aforementioned polynomial expression, the coefficients $c_1, c_2, \ldots, c_n$ belong to the stochastic part of the dynamic model 48 and are related to the noises which may occur during the dosing operations.

Within the framework of this preferred embodiment of the invention, all the coefficients and parameters of the dynamic model 48 of the dosing device 14 are experimentally determined on the basis of the specific characteristics and kind of the dosing device 14 (motor 35, dosing screws 33, mass and elasticity characteristics of the container 32 and of its support 38, and so on) according to procedures well known to those skilled in the control and modeling art.

The coefficients $a_1, a_2, \ldots, a_n, b_0, b_1, \ldots, b_n, c_1, c_2, \ldots, c_n$ and the aforementioned polynomial expression are stored in a data store in a memory of the control system 31, whereby access thereto by various software or hardware components in the system 31 is facilitated. In particular, the dynamic model 48 may be accessed by the prediction component 47 operative to calculate expected weight values of the minor ingredient within the aforementioned prediction time period.

Preferably, the prediction component 47 is operative to calculate said expected weight values on the basis of:
i) the dynamic model 48 of the dosing device 14;
ii) a trend of a model weight error between the actual weight values measured during an evaluation time period of predetermined duration preceding a given dosing instant and the theoretical weight values calculated during said evaluation time period;
iii) a trend of expected weight values of the ingredient calculated during the evaluation time period at a preceding dosing instant;
iv) a current state 43 of the dosing device 14 (hereinafter referred to as "current device state 43") including a regulation state of the dosing device 14 at the dosing instant.

The current device state 43 is generated and updated in each control cycle of the control system 31, and is provided to or is accessed by a control law 46 forming part of the regulator 50. For example, the current device state 43 may be stored as an array or a state vector in memory or a data store in the control system 31, which may be accessed as needed by the control law 46 and periodically updated with new sensor input information every control cycle period or sampling period T (e.g., 100 ms).

The control law 46 provides one or more control output signals or values of the control system 31 based on the current device state 43 and estimation of future states using the prediction component 47 and the dynamic model 48 of the dosing device 14 or a portion thereof.

According to the preferred embodiment illustrated, the control system 31 of the apparatus 100 of the invention further comprises an error function evaluator 49 operative to carry out the following activities:
i) calculate at a predetermined sampling period T the model weight error between the actual weight value measured by the weight sensor 37 and the theoretical weight value;
ii) calculate at said predetermined sampling period T a prediction weight error between the actual weight value measured by the weight sensor 37 and the expected weight value calculated by the prediction component 47.

Preferably, the control system 31 of the apparatus 100 of the invention further comprises a memory (not shown in the drawings) conventional per se and operative to store trends of the actual weight values and of the expected weight values at least during said evaluation time period and said prediction time period.

Preferably, the control system 31 of the apparatus 100 of the invention also comprises an updating component 51 operative to update the dynamic model 48 of the dosing device 14 on the basis of the model weight error and of the prediction weight error calculated at said predetermined sampling period T by the error function evaluator 49.

In the preferred embodiment illustrated, the regulator 50 is operative to regulate the dosing output of the dosing device 14 so as to minimize the prediction weight error and the model weight error within said prediction time period on the basis of an updated dynamic model 48 of the dosing device 14.

The control system 31 further comprises a central processing unit (CPU) embodied within a programmable logic controller (PLC) 42 and provided with an interface for sending or receiving data to or from the dosing device 14 and with a user interface or human-machine interface (HMI) 41 or operator console station, at which an operator enters data or set points for configuring, controlling and monitoring the dosing device 14.

The various operational components of the control system 31 illustrated and described herein may be implemented as software components or objects running in the hardware platform, which may be stored in, and operate on various data in, a data store in memory. It will be appreciated that the control system 31 of the apparatus 100 according to the invention is not limited to such PC based hardware implementations, and may comprise various forms of hardware, software, and combinations thereof.

The exemplary control system 31 further comprises appropriate interfaces or signal conditioning and conversion circuitry (e.g., A/D and D/A converters) adapted to receive and quantify sensor input signals 44 from the weight sensor 37 of the dosing device 14, to provide control output or drive signals 45 to the motor 35 which rotates the dosing screws 33 in particular to control in DC such a motor 35, and to detect the speed of the motor 35.

The control system 31 derives a current state 43 (e.g., such as a state vector) from the sensor signals 44 as illustrated and described further hereinafter with respect to FIG. 2.

The exemplary control system 31 may be structured as an object-oriented software implementation. Other implementations in hardware, software, and/or combinations thereof are contemplated as falling within the scope of the present invention.

In accordance with the present invention, the control law 46 recursively refines the operating state of the regulator 50 operative to regulate the dosing output of the dosing device 14 so as to minimize the prediction weight error between said actual and expected weight values and the model weight error between said actual and theoretical weight values within said prediction time period.

A process for continuously producing an elastomeric composition according to a preferred embodiment of the invention may be carried out by means of the preferred apparatus 100 described above as follows.

In a first step, the extruders 5, 20 comprising a housing including the feed openings 5a, 5b and 20a and the discharge openings 5c and 20b, and at least one screw rotatably mounted in the housing, are provided.

In a second step, a target weight loss of the minor ingredients to be dosed in the elastomeric composition is set, for example on the basis of the amount of ingredient to be dosed in a unitary time period (for example in an hour).

In subsequent steps, at least one elastomer (in the form of rubber crumbs or of pieces of the intermediate rubber mixture) and the fillers are dosed into the extruders 5, 20 while the minor ingredients different from elastomers and fillers are dosed into the extruders 5, 20 by means of the dosing devices 14, 24 provided with a container 32 for storing each minor ingredient or ingredients.

The fillers and the minor ingredients are then mixed and dispersed into said at least one elastomer by means of the extruders 5, 20 and the intermediate and final elastomeric compositions are extruded through the discharge openings 5c, 20b of the extruders 5, 20.

According to the invention, the step of dosing at least one of the ingredients and preferably one or all of the minor ingredients, by means of the dosing devices 3, 8, 11, 14, 24 into the extruders 5, 20 is regulated on the basis of:

i) actual weight values of said at least one ingredient measured at dosing instants of an evaluation time period of predetermined duration preceding a given dosing instant;

ii) expected weight values of said at least one ingredient calculated for corresponding dosing instants of said evaluation time period preceding said dosing instant; and iii) expected weight values of said at least one ingredient calculated for a prediction time period of predetermined duration following said dosing instant;

so as to minimize:

a prediction weight error between actual weight values measured by the weight sensor 37 during said prediction time period and said expected weight values calculated by the prediction component 47 for said prediction time period, and a model weight error between actual weight values measured by the weight sensor 37 during said prediction time period and theoretical weight values of the ingredient corresponding to a target weight loss of the same.

As noted above, the aforementioned evaluation time period and prediction time period are comprised between 5 and 30 seconds, more preferably between 10 and 25 seconds and, still more preferably are of 20 seconds.

In a particularly preferred embodiment, the dosing step of said at least one ingredient, for example the minor ingredients dosed by means of the dosing devices 14, is carried out by implementing one or more of the following steps:

calculating by means of the CPU of the control system 31, preferably at a predetermined sampling period T which is preferably comprised between 25 ms and 1 s (sampling frequency f comprised between 40 and 1 events per second) and most preferably is of 100 ms (sampling frequency f of 10 events per second), said theoretical weight values of said at least one ingredient stored in the container 32 of the dosing device 14 corresponding to the target weight loss of said ingredient;

measuring at a given dosing instant by means of the weight sensor 37, the actual weight value of the ingredient stored in the container 32, said measurement being preferably carried out at said sampling period T;

calculating by means of the prediction component 47 at said dosing instant expected weight values of the ingredient within said prediction time period following the dosing instant, said calculation being carried out on the basis of:

i) the dynamic model 48 of the dosing device 14;

ii) a trend of a model weight error between the actual weight values measured during said evaluation time period preceding said dosing instant and the theoretical weight values calculated during said evaluation time period;

iii) a trend of expected weight values of said at least one ingredient calculated during the evaluation time period at a preceding dosing instant;

iv) a current device state 43 of the dosing device 14 including a regulation state of the dosing device 14 at said dosing instant;

comparing the actual weight value of the ingredient measured at said dosing instant, preferably at said predetermined sampling period T, with an expected weight value calculated by the prediction component 47 for the dosing instant and with a theoretical weight value calculated by means of the CPU of the control system 31 for the dosing instant so as to calculate by means of the error function evaluator 49 for each dosing instant:

i) a model weight error between the actual weight value and the theoretical weight value;

ii) a prediction weight error between the actual weight value and the expected weight value, updating at each dosing instant the calculated trend of the model weight error and the trend of expected weight values calculated by the error function evaluator 49 for the prediction time period following the dosing instant on the basis of the model weight error and of the prediction weight error previously calculated by the error function evaluator 49;

updating the dynamic model 48 of the dosing device 14 by means of the updating component 51 on the basis of the model weight error and of the prediction weight error calculated by the error function evaluator 49;

regulating by means of the regulator 50 the dosing output of the dosing device 14 so as to minimize the prediction weight error and the model weight error within said prediction time period on the basis of the updated dynamic model 48 of the dosing device 14.

In the preferred embodiment illustrated, the dynamic model 48 of the dosing device 14 comprises the above-described polynomial expression including a deterministic component and a stochastic component of the dosing system as a whole.

In the preferred embodiment disclosed, the process of the invention is also advantageously capable to take into account and minimize the effects of the so called "refill" operations by carrying out the dosing step by temporarily omitting the regulation step for a time period of predetermined duration if the actual weight of said the ingredient measured by the weight sensor 37 exceeds a predetermined threshold value.

As illustrated above, in fact, the control system 31 recognizes that a dosing anomaly is taking place in such a case.

Preferably, the predetermined threshold value is equal to or greater than 20% of the difference between the actual weight value and the expected weight value of the ingredient at the dosing instant.

In a first case, if the actual weight value of said at least one ingredient measured by the weight sensor 37 returns to a value lower than said threshold value during a fault period preferably having a duration between 3 and 10 seconds, the aforementioned regulation step is re-established at the end of the fault period.

In these circumstances, therefore, the control system 31 considers that the dosing anomaly is due to an accidental impact on the dosing device or to any other accidental event which only apparently increased the weight of the ingredient stored in the container 32.

In a second case, if the actual weight value of the ingredient measured by the weight sensor 37 remains equal to or greater than said threshold value during said fault period, the aforementioned regulation step is re-established at the end of an oblivion period equal to or greater than the sum of said fault period and twice the prediction time period.

In these circumstances, therefore, the control system 31 considers that the dosing anomaly is not accidental and that the weight increase of the ingredient stored in the container 32 is to be attributed to a refill operation of the latter.

For practical purposes, this oblivion period is preferably comprised between 13 and 70 seconds, more preferably between 20 and 60 seconds and still more preferably is of 40 seconds.

The present invention is now further illustrated by the following non-limiting examples.

EXAMPLE 1

In order to compare the dosing performances of conventional dosing devices equipped with a proportional, integral, derivative (PID) controller used for carrying out conventional processes for continuously producing an elastomeric composition with those of the present invention, the following comparative experimentation was carried out.

One of the dosing devices 14 of the above-described apparatus 100 was equipped in a first test with a conventional PID controller and its container 32 was charged with an ingredient in granular form (subdivided product in granules having cylindrical shape and average dimensions of from 1 mm to 3 mm and including a crosslinking agent (sulfur) dispersed in a ethylene/1-octene copolymer with a 70/30 weight ratio) and in a subsequent test with a control system 31 implementing the process of the present invention.

The amount of said ingredient in granular form present in the container 32 during the tests is reported in FIGS. 3a, 4a, 5a and FIGS. 3b, 4b, 5b (Y axis).

The aim of the tests was that of determining for different mass flow rates the amount of the standard deviations for the following parameters:

1) the weight error values between the actual weight values measured during the test dosing period and the theoretical weight values related to the desired theoretical mass flow rate to be achieved during the test dosing period;

2) the moving average of the weight error values, calculated on samples taken during a period of 1 s (the number of samples depends on the sampling period T or, said in another words, by the sampling frequency f).

The weight error values were measured at a sampling period T of 200 ms for the PID controller of the prior art and of 100 ms for the control system of the present invention.

In this way, the test conditions for the PID controller of the prior art were less severe allowing for a certain filtering of the data with respect to the control system of the present invention in view of the fact that each error sampled at 200 ms may be considered as an average of two errors sampled at 100 ms.

This notwithstanding, the final error data calculated for the PID controller of the prior art are comparable to the error data calculated for the control system of the present invention by calculating the moving average on 5 samples for the prior art and on 10 samples for the present invention.

Notably, the standard deviation of the moving average of the weight error values is deemed to be more significant since it allows to filter the high-period noise of the weight sensor (load cell) and to obtain a more realistic value of the weight decrease (the weight readings are in fact averaged within a time interval of 1 s).

Test n. 1
  Material: subdivided product as defined above.
  Mass flow rate: 250 g/h.
  Test dosing period: 10 min.

In the attached FIGS. 3a and 3b, the results of the dosing tests carried out according to the prior art and to the invention are graphically shown.

More specifically, in FIGS. 3a and 3b the following curves are plotted:

a) curve of actual weight values (dotted line);
b) curve of weight moving average (thin continuous line);
c) curve of weight error moving average between the actual weight values measured during the test dosing period and the theoretical weight values related to the desired theoretical mass flow rate to be achieved during the test dosing period (heavy continuous line).

In FIGS. 3a and 3b, the scale ranges employed in the abscissa and the ordinates were the following:
  X axis: 60 s;
  Y axis: 20 g;
  Y2 axis: ±10 g (only for curve c) of the weight error values.

The calculated values of the standard deviations for the weight error values between the actual weight values measured during the test dosing period and the theoretical weight values and for the moving average of the weight error values are reported in the following Table 1.

Test n. 2
A second test was carried out with the same ingredient and for the same test dosing period but for achieving a mass flow rate of 1000 g/h.

In the attached FIGS. 4a and 4b, the results of the dosing tests carried out according to the prior art and to the invention are graphically shown in the same manner as for Test n. 1.

In FIGS. 4a and 4b, the scale ranges employed in the abscissa and the ordinates were the following:
  X axis: 120 s;
  Y axis: 40 g;
  Y2 axis: ±10 g (only for curve c) of the weight error values.

The calculated values of the standard deviations for the weight error values between the actual weight values measured during the test dosing period and the theoretical weight values and for the moving average of the weight error values are reported in the following Table 1.

Test n. 3
A third test was carried out with the same ingredient and for the same test dosing period but for achieving a mass flow rate of 3000 g/h.

In the attached FIGS. 5a and 5b, the results of the dosing tests carried out according to the prior art and to the invention are graphically shown in the same manner as for Test n. 1.

In FIGS. 5a and 5b, the scale ranges employed in the abscissa and the ordinates were the following:
  X axis: 120 s;
  Y axis: 200 g;
  Y2 axis: ±10 g (only for curve c) of the weight error values.

The calculated values of the standard deviations for the weight error values between the actual weight values measured during the test dosing period and the theoretical weight values and for the moving average of the weight error values are reported in the following Table 1.

EXAMPLE 2

In order to compare the dosing performances of conventional dosing devices equipped with a proportional, integral, derivative (PID) controller with those a dosing device according to the invention, another series of tests were carried out with the same test apparatus of Example 1 by charging the container 32 with an ingredient in granular form (subdivided product in granules having cylindrical shape and average dimensions of from 1 mm to 3 mm and including a crosslinking accelerator (diphenyl guanidine) dispersed in a ethylene/1-octene copolymer with a 70/30 weight ratio).

The amount of said ingredient in granular form present in the container 32 during the tests is reported in FIGS. 6a, 7a, 8a and FIGS. 6b, 7b, 8b (Y axis).

Test n. 1
  Material: subdivided product as defined above.
  Mass flow rate: 250 g/h.
  Test dosing period: 10 min.
  In the attached FIGS. 6a and 6b, the results of the dosing tests carried out according to the prior art and to the invention are graphically shown using the same curve notation of preceding Example 1.
  In FIGS. 6a and 6b, the scale ranges employed in the abscissa and the ordinates were the following:
  X axis: 60 s;
  Y axis: 20 g;
  Y2 axis: ±10 g (only for curve c) of the weight error values.
  The calculated values of the standard deviations for the weight error values between the actual weight values measured during the test dosing period and the theoretical weight values and for the moving average of the weight error values are reported in the following Table 2.
Test n. 2
  A second test was carried out with the same ingredient and for the same test dosing period but for achieving a mass flow rate of 1000 g/h.
  In the attached FIGS. 7a and 7b, the results of the dosing tests carried out according to the prior art and to the invention are graphically shown in the same manner as for Test n. 1.
  In FIGS. 7a and 7b, the scale ranges employed in the abscissa and the ordinates were the following:
  X axis: 120 s;
  Y axis: 40 g;
  Y2 axis: ±10 g (only for curve c) of the weight error values.
  The calculated values of the standard deviations for the weight error values between the actual weight values measured during the test dosing period and the theoretical weight values and for the moving average of the weight error values are reported in the following Table 2.
Test n. 3
  A third test was carried out with the same ingredient and for the same test dosing period but for achieving a mass flow rate of 3000 g/h.
  In the attached FIGS. 8a and 8b, the results of the dosing tests carried out according to the prior art and to the invention are graphically shown in the same manner as for Test n. 1.
  In FIGS. 8a and 8b, the scale ranges employed in the abscissa and the ordinates were the following:
  X axis: 120 s;
  Y axis: 200 g;
  Y2 axis: ±10 g (only for curve c) of the weight error values.
  The calculated values of the standard deviations for the weight error values between the actual weight values measured during the test dosing period and the theoretical weight values and for the moving average of the weight error values are reported in the following Table 2.

EXAMPLE 3

In order to compare the dosing performances of conventional dosing devices equipped with a proportional, integral, derivative (PID) controller with those a dosing device according to the invention in case of use of an anti clogging device, another series of tests were carried out with a test apparatus provided with such an anti clogging device, such as the gravimetric feeder 14 shown in FIG. 2, by charging the container 32 with an ingredient in granular form (subdivided product in granules having cylindrical shape and average dimensions of from 1 mm to 3 mm and including a crosslinking accelerator (N-cyclohexyl-2-benzothiazyl sulphenamide) dispersed in a with a ethylene/1-octene copolymer 70/30 weight ratio).

The amount of said ingredient in granular form present in the container 32 during the test is reported in FIG. 9 (Y axis).
In FIG. 9, the results of the dosing tests carried out according to the invention are graphically shown using the same curve notation of preceding Example 1.
Test n. 1
  Material: subdivided product as defined above.
  Mass flow rate: 1000 g/h.
  Test dosing period: 10 min.
  Test conditions: use of an anti clogging device.
  According to the tests carried out with the PID controller of the prior art, the variations of the weight readings due to the vibrations induced by the anti clogging device moving the granules rendered the regulation practically impossible to the extent that the regulator switched automatically to volumetric control (fixed speed of the dosing screw).
  In sharp contrast, when the gravimetric feeder 14 was equipped with the control system 31 and the production process was operated according to the invention the results as shown in attached FIG. 9 were observed.
  In FIG. 9, the scale ranges employed in the abscissa and the ordinates were the following:
  X axis: 120 s;
  Y axis: 40 g;
  Y2 axis: ±10 g (only for curve c) of the weight error values);
  Std. Dev. achieved operating according to the invention: 0.750 g.
  This value is only slightly higher than those achievable without the anti clogging device (0.540 g), but much lower than the value reached by the prior art (Test n. 2-Example 2: 1.400 g).

TABLE 1

| Flow Rate | Std. Dev. of the weight error calculated for all the weight measurements | Std. Dev. of the moving average of the weight error values (at 1s) | Std. Dev. of the weight error calculated for all the weight measurements | Std. Dev. of the moving average of the weight error values (at 1s) |
| --- | --- | --- | --- | --- |
| | PRIOR ART | | INVENTION | |
| 250 g/h | 1.646 g | 1.430 g | 0.882 g | 0.470 g |
| 1000 g/h | 1.290 g | 1.100 g | 1.090 g | 0.680 g |
| 3000 g/h | 2.740 g | 2.490 g | 1.210 g | 0.600 g |

TABLE 2

| Flow Rate | Std. Dev. of the weight error calculated for all the weight measurements | Std. Dev. of the moving average of the weight error values (at 1s) | Std. Dev. of the weight error calculated for all the weight measurements | Std. Dev. of the moving average of the weight error values (at 1s) |
|---|---|---|---|---|
| | PRIOR ART | | INVENTION | |
| 250 g/h | 1.149 g | 0.980 g | 0.932 g | 0.520 g |
| 1000 g/h | 1.630 g | 1.400 g | 1.100 g | 0.540 g |
| 3000 g/h | 1.370 g | 1.100 g | 1.230 g | 0.430 g |

By observing the data reported in Tables 1 and 2 and the curves illustrated in FIGS. 3a-8b, it may be immediately appreciated that the process and apparatus of the invention allow to continuously produce an elastomeric composition ensuring a sharp decrease of the dosing variability of the ingredients as reflected by the values of standard deviation, which are quite lower than those of the prior art in all the dosing conditions.

This advantageous technical effect is also achieved when an anti clogging device is used, i.e. in circumstances in which the PID dosing regulators of the prior art are not capable to regulate and switch to volumetric control.

Accordingly, the process and apparatus of the invention allow to reliably and repeatably dose the various ingredients, and particularly the minor ingredients, into the rubber base in the continuous production of an elastomeric composition, even for flow rates smaller than 1 kg/h.

This advantageous technical effect also allows to achieve a marked improvement of the physical-chemical and mechanical characteristics of the final elastomeric composition to the advantage of the mechanical characteristics of the tires manufactured starting from this elastomeric composition, mechanical characteristics which are also uniformly maintained among the tires thus manufactured.

The invention has been described above on basis of some illustrative embodiments. It is to be understood that numerous modifications in and changes hereof are possible without thereby going beyond the inventive concept.

The invention claimed is:

1. A process for continuously producing an elastomeric composition, comprising the steps of:
   a) providing at least one extruder comprising a housing, at least one screw rotatably mounted in said housing, said housing comprising at least one feed opening and a discharge opening;
   b) setting a target weight loss for at least one ingredient to be dosed;
   c) dosing into said at least one extruder said at least one ingredient;
   d) mixing and dispersing said at least one ingredient into at least one elastomer by means of said at least one extruder; and
   e) extruding the resulting elastomeric composition through said discharge opening,
   wherein step c) of dosing into said at least one extruder said at least one ingredient is regulated on the basis of:
   i) actual weight values of said at least one ingredient measured at dosing instants of an evaluation time period of predetermined duration preceding a given dosing instant;
   ii) expected weight values of said at least one ingredient calculated for corresponding dosing instants of said evaluation time period preceding said dosing instant; and
   iii) expected weight values of said at least one ingredient calculated for a prediction time period of predetermined duration following said dosing instant;
   so as to minimize:
   a prediction weight error between actual weight values measured during said prediction time period and said expected weight values calculated for said prediction time period, and
   a model weight error between actual weight values measured during said prediction time period and theoretical weight values of said at least one ingredient corresponding to said target weight loss of said at least one ingredient.

2. The process according to claim 1, wherein said expected weight values of said at least one ingredient are calculated for said prediction time period following said dosing instant on the basis of:
   i) a dynamic model of a dosing device;
   ii) a trend of a model weight error between the actual weight values measured during said evaluation time period preceding said dosing instant and the theoretical weight values calculated during said evaluation time period;
   iii) a trend of expected weight values of said at least one ingredient calculated during said evaluation time period at a preceding dosing instant; and
   iv) a current state of the dosing device comprising a regulation state of the dosing device at said dosing instant.

3. The process according to claim 2, wherein a dosing device is a gravimetric feeder comprising a dosing screw.

4. The process according to claim 2, wherein the dynamic model of the dosing device comprises an expression representative of dynamic behavior of the dosing device.

5. The process according to claim 4, wherein said expression is a polynomial expression having the following formula:

$$y(t)=[b_0 u(t-kdt)+b_1 u(t-(k-1)dt+\ldots+b_n u(t-(k-n)dt]/[a_1 y(t-dt)+a_2 y(t-2dt)+\ldots+a_n y(t-ndt)]+[e(t)+c_1 e(t-1dt)+c_2 e(t-2dt)\ldots+c_n e(t-ndt)]/[a_1 y(t-dt)+a_2 y(t-2dt)+\ldots+a_n y(t-ndt)]$$

wherein:
y(t) is the weight of said at least one ingredient at instant t;
u is a speed of a dosing screw of the dosing device;
$b_0, b_1, \ldots, b_n$ are deterministic moving average coefficients of the dynamic model;
$a_1, a_2, \ldots, \ldots, a_n$ are autoregressive coefficients of the dynamic model;
dt is sampling time;
k is transport delay time of the dosing screw
e is Gaussian white noise of the dynamic model; and
$c_1, c_2, \ldots, c_n$ are stochastic moving average coefficients of the model.

6. The process according to claim 1, wherein step c) of dosing into said at least one extruder said at least one ingredient comprises the steps of:
- c1) measuring at a given dosing instant an actual weight value of said at least one ingredient; and
- c2) comparing the actual weight value of said at least one ingredient measured at said dosing instant with an expected weight value calculated for the dosing instant and with a theoretical weight value for the dosing instant so as to calculate for each dosing instant:
  - i) a model weight error between said actual weight value and said theoretical weight value; and
  - ii) a prediction weight error between said actual weight value and the expected weight value.

7. The process according to claim 6 wherein step c) of dosing into said at least one extruder said at least one ingredient comprises:
- c3) updating at each dosing instant a calculated trend of the model weight error and a calculated trend of expected weight values for the prediction time period following the dosing instant on the basis of the model weight error and of the prediction weight error calculated in step c2).

8. The process according to claim 7, wherein step c) of dosing into said at least one extruder said at least one ingredient comprises:
- c4) updating a dynamic model of a dosing device on the basis of said model weight error and said prediction weight error calculated in step c2).

9. The process according to claim 8, wherein step c) of dosing said at least one ingredient into said at least one extruder comprises the step of:
- c5) regulating the dosing output of the dosing device so as to minimize said prediction weight error and said model weight error within said prediction time period on the basis of the updated dynamic model of the dosing device.

10. The process according to claim 9, wherein any one of steps c1)-c5) is carried out at a predetermined sampling period.

11. The process according to claim 10, wherein said predetermined sampling period is between $1/40$ second and 1 second.

12. The process according to claim 1, wherein the prediction time period is between 5 and 30 seconds.

13. The process according to claim 1, wherein said evaluation time period is between 5 and 30 seconds.

14. The process according to claim 1, wherein said dosing step c) comprises temporarily omitting regulation for a time period of predetermined duration if the actual weight value of said at least one ingredient measured at a given dosing instant exceeds a predetermined threshold value.

15. The process according to claim 14, wherein said predetermined threshold value is equal to or greater than 20% of a difference between the actual weight value and the expected weight value of the ingredient at the dosing instant.

16. The process according to claim 14, wherein said dosing step c) comprises re-establishing said regulation after a fault period between 3 and 10 seconds if the actual weight value of said at least one ingredient measured at said given dosing instant returns to a value lower than said threshold value during said fault period.

17. The process according to claim 16, wherein said dosing step c) comprises re-establishing said regulation after an oblivion period equal to or greater than the sum of said fault period and twice the prediction time period if the actual weight value of said at least one ingredient measured at said given dosing instant remains equal to or greater than said threshold value during said fault period.

18. The process according to claim 17, wherein said oblivion period is between 13 and 70 seconds.

19. The process according to claim 1, wherein said at least one ingredient is a minor ingredient of the elastomeric composition different from elastomers and fillers.

20. The process according to claim 19, wherein said minor ingredient is selected from: crosslinking agents, crosslinking accelerators, synthetic resins, crosslinking activators, crosslinking retardants, adhesion promoters, protective agents, coupling agents, and condensation catalysts.

21. The process according to claim 19, wherein said minor ingredient is in the form of a subdivided product comprising said at least one minor ingredient dispersed in at least one thermoplastic binding agent.

22. The process according to claim 21, wherein the subdivided product contains 40% to 98% by weight of said at least one minor ingredient, with respect to the total weight of said product.

23. The process according to claim 21, wherein the thermoplastic binding agent has a melting temperature not lower than 40° C.

24. The process according to claim 21, wherein the thermoplastic binding agent is a polymer selected from:
- (i) ethylene homopolymers or copolymers of ethylene with at least one aliphatic or aromatic alpha-olefin, and ethylene homopolymers or copolymers of ethylene with at least one aliphatic or aromatic alpha-olefin and at least one polyene;
- (ii) copolymers of ethylene with at least one ethylenically unsaturated ester; and
- (iii) polymers obtained by metathesis reaction of at least one cycloalkene;

or mixtures thereof.

25. An apparatus for continuously producing an elastomeric composition, comprising:
- a) at least one extruder comprising a housing, at least one screw rotatably mounted in said housing, said housing comprising at least one feed opening and a discharge opening;
- b) at least one dosing device operative to dose into said at least one extruder at least one ingredient, said dosing device capable of being provided with a container for storing said at least one ingredient;
- c) a weight sensor capable of measuring actual weight values of said at least one ingredient stored in said container; and
- d) a control system capable of regulating the dosing output of said at least one dosing device so as to minimize
  - a prediction weight error between actual weight values measured by the weight sensor during a prediction time period of predetermined duration following said given dosing instant and expected weight values calculated by the control system for said prediction time period, and
  - a model weight error between actual weight values measured by the weight sensor during said prediction time period and theoretical weight values of said at least one ingredient corresponding to a target weight loss of said at least one ingredient.

26. The apparatus according to claim 25, wherein said control system comprises:
- d1) a dynamic model of the dosing device comprising an expression representative of dynamic behavior of the dosing device;

d2) a prediction component capable of calculating said expected weight values of said at least one ingredient stored in said container within said prediction time period; and d3) a regulator capable of regulating the dosing output of the dosing device so as to minimize said prediction weight error and model weight error.

27. The apparatus according to claim 26, wherein said prediction component is capable of calculating said expected weight values on the basis of:

i) the dynamic model of the dosing device;

ii) a trend of a model weight error between the actual weight values measured during an evaluation time period preceding a given dosing instant and the theoretical weight values calculated during said evaluation time period;

iii) a trend of expected weight values of said at least one ingredient calculated during the evaluation time period at a preceding dosing instant; and iv) a current state of the dosing device comprising a regulation state of the dosing device at the dosing instant.

28. The apparatus according to claim 27, wherein said control system further comprises an error function evaluator capable of:

i) calculating at a predetermined sampling period said model weight error between the actual weight value measured by the weight sensor and the theoretical weight value; and ii) calculating at said predetermined sampling period, a prediction weight error between the actual weight value measured by the weight sensor and the expected weight value calculated by the prediction component.

29. The apparatus according to claim 28, wherein said control system further comprises an updating component capable of updating the dynamic model of the dosing device on the basis of said model weight error and said prediction weight error calculated at said predetermined sampling period by the error function evaluator.

30. The apparatus according to claim 29, wherein said regulator is capable of regulating the dosing output of the dosing device so as to minimize said prediction weight error and said model weight error within said prediction time period on the basis of an updated dynamic model of the dosing device.

31. The apparatus according to claim 26, wherein the dynamic model of the dosing device comprises a polynomial expression having the following formula:

$$y(t)=[b_0 u(t-kdt)+b_1 u(t-(k-1)dt)+\ldots+b_n u(t-(k-n)dt)]/[a_1 y(t-dt)+a_2 y(t-2dt)+\ldots+a_n y(t-ndt)]+[e(t)+c_1 e(t-1dt)+c_2 e(t-2dt)\ldots+c_n e(t-ndt)]/[a_1 y(t-dt)+a_2 y(t-2dt)+\ldots+a_n y(t-ndt)]$$

wherein:

y(t) is the weight of said at least one ingredient at instant t;

u is a speed of a dosing screw of the dosing device;

$b_0, b_1, \ldots, b_n$ are deterministic moving average coefficients of the dynamic model;

$a_1, a_2, \ldots, a_n$ are autoregressive coefficients of the dynamic model;

dt is sampling time;

k is transport delay time of the dosing screw e is Gaussian white noise of the dynamic model; and $c_1, c_2, \ldots, c_n$ are stochastic moving average coefficients of the dynamic model.

32. The apparatus according to claim 27, wherein said control system further comprises a memory operative to store trends of the actual weight values and of the expected weight values at least during said evaluation time period and said prediction time period.

33. The apparatus according to claim 25, wherein said dosing device is a gravimetric feeder comprising a dosing screw.

34. The apparatus according to claim 25, wherein said control system further comprises a central processing unit provided with an interface for sending or receiving data to or from the dosing device and with a user interface or human-machine interface or operator console station, at which an operator enters data or set points for configuring, controlling and monitoring the dosing device.

35. The apparatus according to claim 25, comprising a first extruder capable of producing an intermediate elastomeric composition devoid of temperature-sensitive minor ingredients and a second extruder capable of producing a complete elastomeric composition comprising said temperature-sensitive minor ingredients.

36. The apparatus according to claim 25, further comprising at least one pneumatic conveying line capable of being adapted to convey said at least one ingredient from a storage bin to said at least one dosing device.

37. The apparatus according to claim 25, further comprising at least one filtering body capable of filtering the elastomeric composition discharged from said at least one extruder.

* * * * *

UNITED STATES PATENT AND TRADEMARK OFFICE
CERTIFICATE OF CORRECTION

PATENT NO. : 8,322,907 B2
APPLICATION NO. : 12/733208
DATED : December 4, 2012
INVENTOR(S) : Cesare Emanuele Amurri et al.

It is certified that error appears in the above-identified patent and that said Letters Patent is hereby corrected as shown below:

In the Claims

Claim 5, col. 28, lines 51-55,

"$y(t) = [b_0 u(t-kdt) + b_1 u(t-(k-1)dt) + ... + b_n u(t-(k-n)dt]/[a_1 y(t-dt) + a_2 y(t-2dt) + ... + a_n y(t-ndt)] + [e(t) + c_1 e(t-1dt) + c_2 e(t-2dt)... + c_n e(t-ndt)]/[a_1 y(t-dt) + a_2 y(t-2dt) + ... + a_n y(t-ndt)]$"

should read as

--$y(t) = [b_0 u(t-kdt) + b_1 u(t-(k-1)dt) + ... + b_n u(t-(k-n)dt]/[a_1 y(t-dt) + a_2 y(t-2dt) + .. + a_n y(t-ndt)] + [e(t) + c_1 e(t-1dt) + c_2 e(t-2dt)... + c_n e(t-ndt)]/[a_1 y(t-dt) + a_2 y(t-2dt) + .. + a_n y(t-ndt)]$--.

Claim 5, col. 28, line 67, "model." should read --dynamic model.--.

Claim 31, col. 32, lines 1-4,

"$y(t) = [b_0 u(t-kdt) + b_1 u(t-(k-1)dt) + ... + b_n u(t-(k-n)dt]/[a_1 y(t-dt) + a_2 y(t-2dt) + ... + a_n y(t-ndt)] + [e(t) + c_1 e(t-1dt) + c_2 e(t-2dt)... + c_n e(t-ndt)]/[a_1 y(t-dt) + a_2 y(t-2dt) + ... + a_n y(t-ndt)]$"

should read as

--$y(t) = [b_0 u(t-kdt) + b_1 u(t-(k-1)dt) + ... + b_n u(t-(k-n)dt]/[a_1 y(t-dt) + a_2 y(t-2dt) + .. + a_n y(t-ndt)] + [e(t) + c_1 e(t-1dt) + c_2 e(t-2dt)... + c_n e(t-ndt)]/[a_1 y(t-dt) + a_2 y(t-2dt) + .. + a_n y(t-ndt)]$--.

Signed and Sealed this
Eleventh Day of March, 2014

Michelle K. Lee
*Deputy Director of the United States Patent and Trademark Office*